US012680913B2

(12) United States Patent　(10) Patent No.: US 12,680,913 B2
Maki et al.　(45) Date of Patent: Jul. 14, 2026

(54) GAS SENSOR

(71) Applicant: NGK INSULATORS, LTD., Nagoya (JP)

(72) Inventors: Shintaro Maki, Nagoya (JP); Kota Katagiri, Nagoya (JP); Kohei Yaita, Nagoya (JP); Yuya Seike, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 210 days.

(21) Appl. No.: 18/415,478

(22) Filed: Jan. 17, 2024

(65) Prior Publication Data

US 2024/0241012 A1　Jul. 18, 2024

(30) Foreign Application Priority Data

Jan. 18, 2023　(JP) ................................. 2023-006197

(51) Int. Cl.
*G01M 15/10*　(2006.01)
*G01N 27/407*　(2006.01)
(52) U.S. Cl.
CPC ...... *G01M 15/102* (2013.01); *G01N 27/4078* (2013.01)
(58) Field of Classification Search
CPC ............. G01M 15/102; F01N 2560/02; G01N 27/407; G01N 27/4078; G01N 27/4162
See application file for complete search history.

(56) References Cited

U.S. PATENT DOCUMENTS

2015/0260698 A1*　9/2015　Hirata ................ G01N 27/4078
73/23.31
2016/0223504 A1*　8/2016　Yonezu ............. G01N 27/4077
2021/0349051 A1*　11/2021　Okai .................. G01N 27/4062
2024/0175843 A1*　5/2024　Okai .................. G01M 15/102

FOREIGN PATENT DOCUMENTS

DE　10 2016 008 575 A1　1/2017
JP　2020-173234 A　10/2020

OTHER PUBLICATIONS

German Office Action received in corresponding German Application No. 10 2023 131 868.3 dated May 12, 2026.

* cited by examiner

*Primary Examiner* — Thomas M Hammond, III
(74) *Attorney, Agent, or Firm* — MATTINGLY & MALUR, PC

(57) ABSTRACT

Provided is a gas sensor that prevents risks such as deterioration of airtightness of the interior of an outer tube, rupture of an elastic body, and occurrence of the displacement of a contact point without swaging a rear end side of the outer tube to have a tapered shape. In the gas sensor according to one aspect of the present invention, a diameter of a reduced diameter portion formed on a rear end side of a tubular body and swaging the elastic body is constant in the axial direction, and a value of a comprehensive parameter which is an index for evaluating the deformation of the elastic body is 0.038 or more and 0.171 or less.

14 Claims, 4 Drawing Sheets

LEADING END SIDE ◄————► REAR END SIDE

LEADING END SIDE ← → REAR END SIDE

LEADING END SIDE  ←→  REAR END SIDE

GAS SENSOR

CROSS-REFERENCE TO RELATED APPLICATION

The present application claims priority from Japanese application JP 2023-006197, filed on Jan. 18, 2023, the contents of which is hereby incorporated by reference into this application.

FIELD OF INVENTION

The present invention relates to a gas sensor.

BACKGROUND

In the related art, there is a gas sensor detects the concentration of a specific gas, such as oxygen and NOx, in a gas to be measured, such as an exhaust gas of an automobile. A known gas sensor has the following configuration, for example. That is, a known gas sensor includes an outer tube that houses a sensor element, an elastic body sealing an opening of the outer tube, a lead wire inserted into the elastic body, and a connector electrically connecting the sensor element and the lead wire. In such a gas sensor, the elastic body is fixed by swaging the outer tube. Various attempts have been made to ensure the airtightness of the interior of the outer tube for the gas sensor having such a configuration. For example, JP 2020-173234 A listed below discloses a gas sensor intended to ensure airtightness of the interior of the outer tube by swaging the outer tube to have a tapered shape.

SUMMARY OF INVENTION

The inventors of the present invention have found that the following problem may occur in a gas sensor in which a sensor element is housed and a rear end side of an outer tube whose rear end opening is sealed by an elastic body is swaged to have a tapered shape. That is, in the gas sensor having the above-described configuration, stress concentrates on a part of the elastic body, and thus the risk of rupture of the elastic body increases. A portion where stress is concentrated accelerates wear, and as a result, airtightness of the interior of the outer tube is likely to deteriorate early. Furthermore, a swaged portion, which is a portion of the elastic body swaged by the outer tube, may be tapered and vary in diameter in the axial direction. This leads to increased difficulty in controlling the diameter dimension of the swaged portion necessary for ensuring the airtightness of the interior of the outer tube. This results in materialization of a risk that the airtightness of the interior of the outer tube achieved by the elastic body may become unstable. In addition, when the elastic body is swaged to have a tapered shape, compressive force applied to the elastic body is large. Thus, the deformation and movement of the elastic body in the axial direction are large, and there is a high risk that electrical connection between the connector and the lead wire may be lost (i.e., displacement of a contact point may occur).

As has been described above, the inventors of the present invention have found the following: when the rear end side of the outer tube is swaged to have a tapered shape, stress tends to concentrate in the axial direction in the elastic body, resulting in increases of risks such as deterioration of the airtightness of the interior of the outer tube, rupture of the elastic body, and occurrence of the displacement of a contact point.

In one aspect, the present invention has been made in view of such circumstances. An object of the present invention is to provide a gas sensor that reduces risks such as deterioration of the airtightness of the interior of an outer tube, rupture of an elastic body, and occurrence of the displacement of a contact point without swaging a rear end side of the outer tube to have a tapered shape.

In order to solve the above-described problems, the present invention adopts the following configuration.

A gas sensor according to a first aspect is configured to detect a concentration of a specific gas in a gas to be measured. The gas sensor includes: a sensor element extending in an axial direction, the sensor element including a detector on a leading end side, and an element electrode on a rear end side; a tubular body including an opening end, the sensor element being disposed inside the tubular body; a terminal metal fitting extending in the axial direction; a lead wire being electrically connected to the element electrode via the terminal metal fitting, the lead wire extending outward from the opening end; an elastic body configured to seal the opening end, the lead wire being inserted into the elastic body; and a position fixing portion being in contact with a first end surface being an end surface of the elastic body on the leading end side in the axial direction, the position fixing portion configured to restrict the first end surface from moving toward the leading end side in the axial direction. In the gas sensor, the tubular body includes a reduced diameter portion being formed on a rear end side of the tubular body, the reduced diameter portion configured to swage a part of the elastic body from a periphery, the tubular body in the reduced diameter portion has a diameter being constant in the axial direction, the elastic body has a post-swaging diameter Db being constant in the axial direction, the post-swaging diameter Db being a diameter of a swaged portion that is a portion of the elastic body being swaged by the reduced diameter portion, and the gas sensor satisfies Mathematical Expression (1) below:

$$0.038 \le \{(Lc \times Af)/(Ae \times Ld)\} \times \qquad \text{Mathematical Expression (1)}$$

$$(1 - Db/Da) \le 0.171.$$

In Mathematical Expression (1), "Da" represents a pre-swaging diameter Da being a diameter of the elastic body before being swaged from the periphery by the reduced diameter portion, "Db" represents the post-swaging diameter Db, "Lc" represents a length Lc of the reduced diameter portion, the length Lc being a length of the reduced diameter portion in the axial direction, "Ld" represents a length Ld of a non-swaged portion, the length Ld being a length of the non-swaged portion of the elastic body, the non-swaged portion being on the leading end side with respect to the swaged portion in the axial direction, "Ae" represents a first area Ae being an area of the first end surface, and "Af" represents a second area Af being an area of a second end surface, the second end surface being in contact with the first end surface, the second end surface being an end surface of the position fixing portion on the rear end side in the axial direction.

In the gas sensor with this configuration, the diameter of the tubular body (corresponding to the "outer tube" in the related art) in the reduced diameter portion is constant in the axial direction, and the post-swaging diameter Db, which is the diameter of the swaged portion of the elastic body, is constant in the axial direction. Therefore, the gas sensor can solve the problems of the known gas sensors. Such problems include "increased difficulty in ensuring the airtightness of the interior of the outer tube and increased risks such as rupture of the elastic body and occurrence of the displacement of a contact point, due to swaging the rear end side of the outer tube (tubular body) to have a tapered shape". That is, the gas sensor makes a diameter of the tubular body in the reduced diameter portion constant in the axial direction and thus exerts an effect that risks can be reduced. Such risks include "deterioration of the airtightness of the interior of the outer tube, rupture of the elastic body, and occurrence of the displacement of a contact point" and are increased by swaging a rear end side of an outer tube (tubular body) to have a tapered shape.

Here, in order to obtain good airtightness of the tubular body, it is important that the elastic body (the elastic body that seals the opening end of the tubular body and into which the lead wire is inserted) is swaged from the periphery to apply an appropriate stress to the elastic body. A generally known technique for improving the airtightness of the interior of the tubular body is to reduce the diameter of the reduced diameter portion within a range in which excessive stress in the axial direction is not applied to a portion of the elastic body swaged from the periphery by the tubular body (the swaged portion). However, too large compressibility of the elastic body obtained by reducing the diameter of the reduced diameter portion leads to the excessively large deformation of the elastic body in the axial direction. This results in difficulty in maintaining a position of the first end surface, which is an end surface of the elastic body on the leading end side in the axial direction, within an allowable range by the position fixing portion. For example, it becomes difficult to maintain the position of the first end surface by the position fixing portion within a range in which the displacement of a contact point does not occur.

Given these factors, the gas sensor is configured such that an appropriate stress is applied to the non-swaged portion of the elastic body, thereby ensuring good airtightness of the interior of the tubular body even when the diameter of the tubular body and the post-swaging diameter Db in the reduced diameter portion are constant in the axial direction. That is, the gas sensor converts the deformation in the axial direction of the elastic body caused in accordance with the length Lc of the reduced diameter portion and the amount of compression of the elastic body into the deformation in the radial direction (deformation contributing to airtightness) with the position fixing portion, thereby achieving good airtightness of the interior of the tubular body. In particular, by adjusting the size and the like of each member so as to satisfy the Mathematical Expression (1), the gas sensor can prevent the deformation of the elastic body in the axial direction from becoming too large and maintain the position of the first end surface of the elastic body within an allowable range by the position fixing portion.

Specifically, a compressibility Rc of the elastic body is expressed as "$Re=1-Db/Da$", where Da represents the pre-swaging diameter of the elastic body and Db represents the post-swaging diameter of the elastic body (the swaged portion).

Therefore, an amount of deformation in the axial direction (in particular, an amount of deformation toward the leading end side) A [mm] of the elastic body can be expressed as "$\Delta=k\times Lc\times Rc$", where k represents a constant determined by the material of the elastic body, Lc represents the length of the reduced diameter portion, and Rc represents the compressibility of the elastic body. Note that the elastic body is deformed from the center position in the axial direction of the swaged portion to both sides in the axial direction. Thus, the amount of deformation $\Delta$ of the elastic body toward the leading end side in the axial direction is, for example, half ("½") of an amount of deformation of the elastic body to both sides (both the leading end side and the rear end side) in the axial direction. Here, since the constant k includes "½", the amount of deformation of the elastic body toward the leading end side in the axial direction can be expressed by A as can be obtained from "$\Delta=k\times Lc\times Rc$". Therefore, a first parameter Pf, which is a ratio of the amount of deformation $\Delta$ in the axial direction to the length Ld of the non-swaged portion of the elastic body, can be expressed as "$Pf=\Delta/Ld$". Then, as described above, since "$\Delta=k\times Lc\times Rc$" and "$Re=1-Db/Da$" hold, the first parameter Pf can be expressed as "$Pf=\{k\times Lc\times(1-Db/Da)\}/Ld$". The first parameter Pf is an index for evaluating the efficiency (conversion efficiency) of converting the stress applied to the elastic body into deformation in the axial direction. The larger the value of the first parameter Pf, the higher the conversion efficiency of converting the stress applied to the elastic body into deformation in the axial direction.

In the elastic body, a second parameter Ps, which is an index for evaluating the efficiency of converting deformation in the axial direction into deformation in the radial direction, can be expressed as follows. That is, the second parameter Ps can be expressed as a ratio of the second area Af being the area of the end surface on the rear end side of the position fixing portion (the second end surface) to the first area Ae being the area of the end surface on the leading end side of the elastic body (the first end surface). Specifically, the second parameter Ps can be expressed as "$Ps=Af/Ae$". The larger the value of the second parameter Ps, the higher the efficiency of converting deformation in the axial direction into deformation in the radial direction in the elastic body.

As described above, the larger the value of the first parameter Pf, the higher the conversion efficiency of converting the stress applied to the elastic body into deformation in the axial direction. The larger the value of the second parameter Ps, the higher the efficiency of converting deformation in the axial direction into deformation in the radial direction in the elastic body. Therefore, a comprehensive parameter Pc, which is an index for evaluating deformation (the amount of deformation in the axial direction, the amount of deformation in the radial direction, balance between both, and the like) of the elastic body, can be expressed as "$Pc=Pf\times Ps$". Then, since "$Pf=\{k\times Lc\times(1-Db/Da)\}/Ld$" and "$Ps=Af/Ae$" hold, the comprehensive parameter Pc can be expressed as "$Pc=k\times\{(Lc\times Af)/(Ae\times Ld)\}\times(1-Db/Da)$".

The inventors of the present invention have confirmed through an experiment that "0.038k" or more of the value of the comprehensive parameter Pc contributes to ensuring the airtightness of the tubular body (corresponding to the outer tube in the related art), which is to be achieved by the elastic body.

In addition, the inventors of the present invention have confirmed through the experiment that "0.171k" or less of the value of the comprehensive parameter Pc contributes to avoiding a situation where "deformation and movement of the elastic body in the axial direction are increased to cause displacement of a contact point".

Specifically, in the gas sensor, when "the deformation in the axial direction of the elastic body becomes excessive, and deformation in the axial direction is not fully converted into deformation in the radial direction by the position fixing portion", the position fixing portion itself moves in the axial direction (in particular, toward the leading end side). As such, the inventors of the present invention have obtained through the experiment the value of the comprehensive parameter Pc in a range in which "the position fixing portion can convert the deformation in the axial direction of the elastic body into the deformation in the radial direction". Specifically, the inventors of the present invention have obtained through the experiment the value of the comprehensive parameter Pc with which the positional movement (movement toward the leading end side) of the first end surface of the elastic body is maintained within an allowable range. As a result, the inventors of the present invention have confirmed that the positional movement of the first end surface of the elastic body can be maintained within an allowable range by setting the value of the comprehensive parameter Pc to "0.171k" or less.

As has been described above, the inventors of the present invention have confirmed through an experiment that the airtightness of the interior of the tubular body (outer tube) can be ensured and occurrence of the displacement of a contact point can be effectively prevented when the value of the comprehensive parameter Pc falls within the following range. That is, the inventors of the present invention have confirmed that airtightness can be ensured, and occurrence of the displacement of a contact point can be effectively prevented by setting the value of the comprehensive parameter Pc is set to "0.038k" or more and "0.171k" or less. Here, since "Pc=k×{(Lc×Af)/(Ae×Ld)}×(1−Db/Da)" holds, the expression concerning the comprehensive parameter Pc can be rearranged to "0.038k≤k×{(Lc×Af)/(Ae×Ld)}×(1−Db/Da)≤0.171k". Since the "constant k" is common in each side of the relational expression, when the constant k is excluded from each side, "0.038≤{(Lc×Af)/(Ae×Ld)}×(1−Db/Da)≤0.171" is obtained.

The gas sensor satisfies the Mathematical Expression (1), that is, satisfies "0.038≤{(Lc×Af)/(Ae×Ld)}×(1−Db/Da)≤0.171". Therefore, the gas sensor exerts an effect that the airtightness of the interior of the tubular body can be ensured as well as occurrence of the displacement of a contact point can be effectively prevented, without swaging the rear end side of the outer tube (tubular body) to have a tapered shape.

Note that the inventors of the present invention have confirmed through the experiment that the second parameter Ps is not improved even when the second area Af is made larger than the first area Ae, where the first area Ae is the area of the first end surface of the elastic body, and the second area Af is the area of the second end surface of the position fixing portion.

In addition, the inventors of the present invention have confirmed through the experiment that the upper limit of the compressibility Rc (=1−Db/Da) of the elastic body is determined in accordance with the material of the elastic body. For example, when fluororubber is used as the material of the elastic body, the upper limit (compression limit) of the compressibility Rc is "0.25". The inventors of the present invention have also confirmed that the elastic body is not ruptured (i.e., the risk of rupture of the elastic body can be reduced) when the compressibility Rc of the elastic body falls within a range of a compression limit (e.g., "0.25") or less determined in accordance with the material of the elastic body.

In the gas sensor according to a second aspect dependent on the gas sensor according to the first aspect, the pre-swaging diameter Da of the elastic body, the post-swaging diameter Db of the elastic body, the length Lc of the reduced diameter portion, the length Ld of the non-swaged portion of the elastic body, the first area Ae being the area of the first end surface of the elastic body, and the second area Af being the area of the second end surface of the position fixing portion may satisfy Mathematical Expression (2) below:

$$0.050 \le \{(Lc \times Af)/(Ae \times Ld)\} \times \qquad \text{Mathematical Expression (2)}$$
$$(1 - Db/Da) \le 0.094.$$

In this configuration, the gas sensor satisfies the Mathematical Expression (2), that is, satisfies "0.050≤{(Lc×Af)/(Ae×Ld)}×(1−Db/Da)≤0.094". The inventors of the present invention have confirmed through the experiment that the comprehensive parameters Pc set to "0.050k" or more and "0.094k" or less can remarkably improve the airtightness of the interior of the tubular body and can highly effectively prevent occurrence of the displacement of a contact point. Therefore, the gas sensor satisfying "0.050≤{(Lc×Af)/(Ae× Ld)}×(1−Db/Da)≤0.094" exerts an effect that remarkably good airtightness of the interior of the tubular body can be ensured, and occurrence of the displacement of a contact point can be highly effectively prevented.

In a gas sensor according to a third aspect dependent on the gas sensor according to the first or second aspect, the elastic body may contain fluororubber. In this configuration, the material of the elastic body is fluororubber having excellent properties in various aspects such as resistance and strength and being particularly excellent in heat resistance and oil resistance. Therefore, the gas sensor exerts an effect that, for example, the sealing property of the elastic body can be ensured even in a high-temperature environment and the detection accuracy of the gas concentration can be maintained and improved.

In a gas sensor according to a fourth aspect dependent on the gas sensor according to any one of the first to third aspects, a diameter of the non-swaged portion may vary in the axial direction. In the gas sensor with this configuration, the diameter of the non-swaged portions varies in the axial direction. Therefore, the gas sensor exerts an effect that risks can be reduced by using the elastic body in which the diameter of the non-swaged portion varies in the axial direction. Such risks include "deterioration of the airtightness of the interior of the outer tube (tubular body), rupture of the elastic body, and occurrence of the displacement of a contact point".

In a gas sensor according to a fifth aspect dependent on the gas sensor according to the fourth aspect, a diameter of the non-swaged portion may be smaller toward the leading end side in the axial direction. In the gas sensor with this configuration, the diameter of the non-swaged portions is smaller toward the leading end side in the axial direction. Therefore, the gas sensor exerts an effect that risks can be reduced by using the elastic body in which the diameter of the non-swaged portion is smaller toward the leading end side in the axial direction. Such risks include "deterioration of the airtightness of the outer tube (tubular body), rupture of the elastic body, and occurrence of the displacement of a contact point".

In a gas sensor according to a sixth aspect dependent on the gas sensor according to the fourth or fifth aspect, an end portion of the non-swaged portion on the leading end side in the axial direction may be chamfered. In the gas sensor with this configuration, an end of the non-swaged portion on the leading end side in the axial direction is chamfered. Therefore, the gas sensor exerts an effect that risks can be reduced by using the elastic body in which the end of the non-swaged portion on the leading end side in the axial direction is chamfered. Such risks include "deterioration of the airtightness of the outer tube (tubular body), rupture of the elastic body, and occurrence of the displacement of a contact point".

In a gas sensor according to a seventh aspect dependent on the gas sensor according to any one of the first to sixth aspect, the position fixing portion may be any one of (1) a ceramic housing that houses the element electrode and an element contact portion of the terminal metal fitting, the element contact portion being electrically connected to the element electrode, (2) a spacer being disposed on the rear end side in the axial direction with respect to the ceramic housing, the spacer being restricted from moving to the leading end side in the axial direction by the ceramic housing, and (3) the ceramic housing being formed integrally with the spacer. In the gas sensor with this configuration, the position fixing portion is any one of the ceramic housing, the spacer, and the ceramic housing formed integrally with the spacer. Therefore, the gas sensor exerts an effect that risks can be reduced by using any one of the ceramic housing, the spacer, and a member obtained by integrally molding the ceramic housing and the spacer. Such risks include "deterioration of the airtightness of the outer tube (tubular body), rupture of the elastic body, and occurrence of the displacement of a contact point".

In a gas sensor according to an eighth aspect dependent on the gas sensor according to any one of the first to seventh aspect, a plurality of the reduced diameter portions may be formed on the rear end side of the tubular body, and each of the pre-swaging diameter Da, the length Ld of the non-swaged portion, the first area Ae, and the second area Af is common among the plurality of reduced diameter portions, and a total of $\{(Lc \times Af)/(Ae \times Ld)\} \times (1-Db/Da)$ being respectively calculated for the plurality of reduced diameter portions using the post-swaging diameter Db and the length Lc of each of the plurality of reduced diameter portions may be 0.038 or more and 0.171 or less.

In the gas sensor with this configuration, in the gas sensor, a plurality of the reduced diameter portions is formed on the rear end side of the tubular body. In the gas sensor, the pre-swaging diameter Da, the length Ld of the non-swaged portion, the first area Ae, and the second area Af are common among a plurality of the reduced diameter portions. In the gas sensor, a total of the comprehensive parameters Pc (however, the constant k is excluded) calculated for each of a plurality of the reduced diameter portions using the post-swaging diameter Db and the length Lc of each of a plurality of the reduced diameter portions is 0.038 or more and 0.171 or less.

The inventors of the present invention conducted an experiment using a gas sensor in which a plurality of the reduced diameter portions are formed in the tubular body, and confirmed that when the size and the like of each constituent element satisfy the following conditions, airtightness of the interior of the tubular body can be secured, and occurrence of displacement of a contact point can be effectively prevented. That is, the inventors have confirmed that when the total of comprehensive parameters Pc respectively calculated for a plurality of the reduced diameter portions is "0.038k" or more and "0.171k" or less, the airtightness of the interior of the tubular body can be ensured, and occurrence of the displacement of a contact point can be effectively prevented.

In the gas sensor, a plurality of the reduced diameter portions are formed on the rear end side of the tubular body, and a total of "$\{(Lc \times Af)/(Ae \times Ld)\} \times (1-Db/Da)$" respectively calculated for a plurality of reduced diameter portions is "0.038" or more and "0.171" or less. Therefore, the gas sensor includes a plurality of the reduced diameter portions formed on the rear end side of the tubular body and exerts an effect that the airtightness of the interior of the tubular body can be ensured as well as occurrence of the displacement of a contact point can be effectively prevented.

According to the present invention, it is possible to provide a gas sensor that prevents risks such as deterioration of the airtightness of the interior of an outer tube, rupture of an elastic body, and occurrence of the displacement of a contact point without swaging a rear end side of the outer tube to have a tapered shape.

DETAILED DESCRIPTION OF THE PREFERRED EMBODIMENTS

Figure 1:
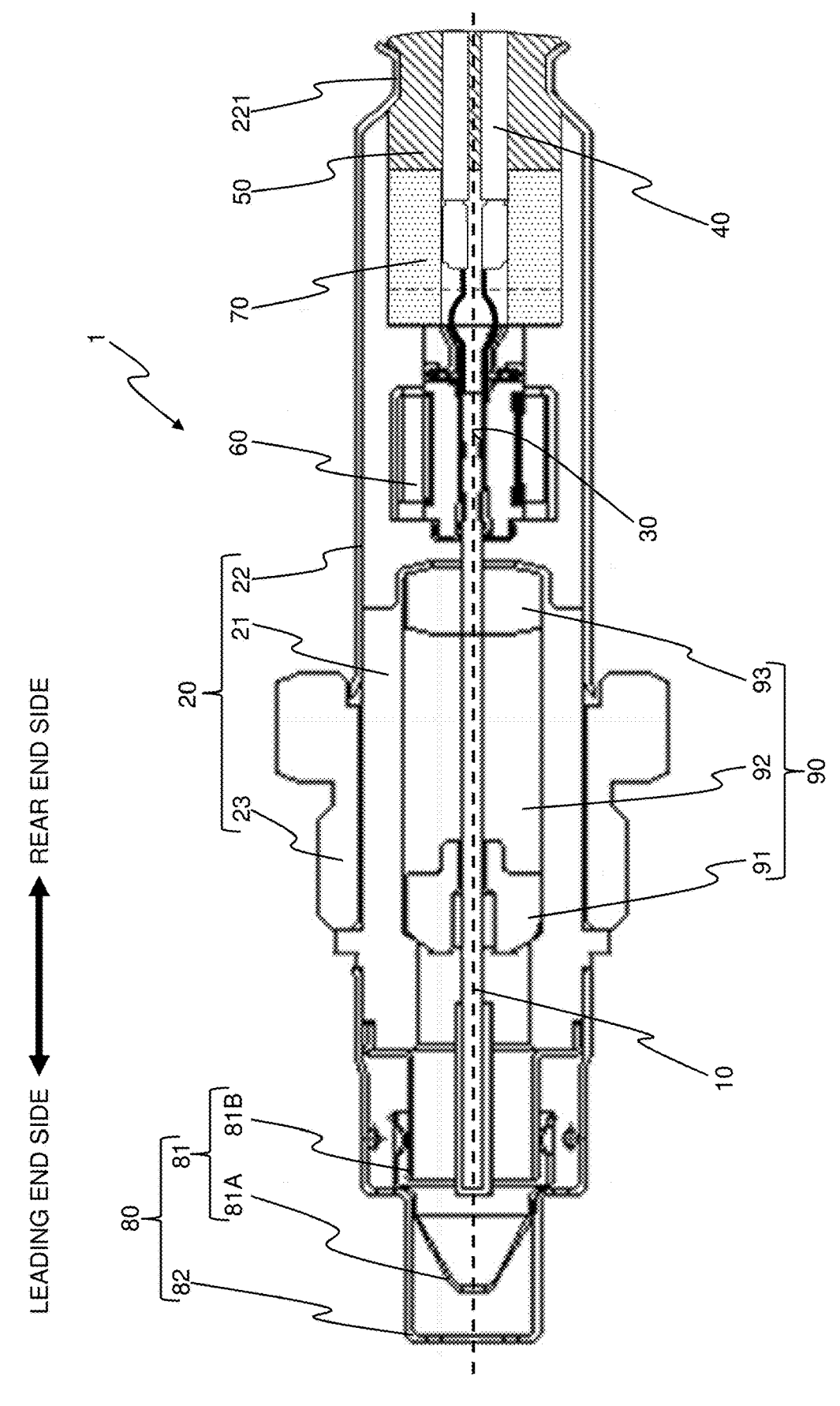
FIG. 1 is a schematic partial cross-sectional view schematically illustrating an example of a main configuration of a gas sensor according to an embodiment.

An embodiment according to one aspect of the present invention (hereinafter, also referred to as "the present embodiment") will be described below with reference to the drawings. Provided, however, that the present embodiment described below is merely an example of the present invention in all respects. It goes without saying that various improvements and modifications can be made without departing from the scope of the present invention. That is, a specific configuration according to an embodiment may be appropriately adopted to carry out the present invention.

The inventors of the present invention have found that the following problem may occur in a gas sensor in the related art in which a sensor element is housed and a rear end side of a tubular body (outer tube) whose rear end opening is sealed by an elastic body is swaged to have a tapered shape. That is, the inventors of the present invention have found the following: when the rear end side of the tubular body is swaged to have a tapered shape, stress tends to concentrate in the axial direction at the elastic body, resulting in increases of risks such as deterioration of the airtightness of the interior of the tubular body, rupture of the elastic body, and occurrence of the displacement of a contact point.

In view of the above, in the gas sensor according to one aspect of the present invention, the diameter of a reduced diameter portion formed on the rear end side of the tubular body and swaging the elastic body is made constant in the axial direction of the gas sensor (sensor element). The gas sensor according to one aspect of the present invention having a constant diameter of the reduced diameter portion in the axial direction solves the above-described problems found in the known gas sensors. Specifically, the gas sensor according to one aspect of the present invention solves the problems of the known gas sensors. Such problems include "increased difficulty in ensuring the airtightness of the interior of the tubular body and increased risks such as rupture of the elastic body and occurrence of the displacement of a contact point, due to swaging the rear end side of the tubular body to have a tapered shape". A gas sensor according to one aspect of the present invention makes a diameter of the tubular body in the reduced diameter portion constant in the axial direction, thereby reducing risks. Such risks include "deterioration of the airtightness of the interior of the outer tube, rupture of the elastic body, and occurrence of the displacement of a contact point" and are raised by swaging a rear end side of an outer tube (tubular body) to have a tapered shape.

Furthermore, in the gas sensor according to one aspect of the present invention, the size and the like of each member are adjusted for ensuring the suitable stress applied to the elastic body due to swaging by the reduced diameter portion. As a result, a predetermined relational expression (specifically, Mathematical Expression (1) to be described later) is satisfied. Although details will be described later, the gas sensor in which the size of each member and the like satisfy Mathematical Expression (1) can reduce the risk of movement of the elastic body in the axial direction and the like by relaxing the stress in the axial direction and can achieve good airtightness of the interior of the tubular body by generating a suitable magnitude of stress in the radial direction.

Specifically, a gas sensor according to one aspect of the present invention includes a position fixing portion. The position fixing portion is in contact with a first end surface, which is an end surface on a leading end side in the axial direction of the elastic body that seals an opening end of a tubular body. The position fixing portion accordingly restricts the movement of the first end surface toward the leading end side in the axial direction. In the gas sensor according to one aspect of the present invention, the size and the like of each member are adjusted so as to satisfy Mathematical Expression (1). In this way, the gas sensor with the above-described position fixing portion suitably converts the deformation in the axial direction of the elastic body into the deformation in the radial direction contributing to the airtightness of the interior of the tubular body. Therefore, the gas sensor according to one aspect of the present invention exerts an effect that good airtightness of the interior of the tubular body can be achieved and occurrence of the displacement of a contact point can be effectively prevented.

As described above, in the gas sensor according to one aspect of the present invention, the diameter of the reduced diameter portion is constant in the axial direction. The reduced diameter portion is formed on the rear end side of the tubular body to fix the elastic body. By adopting such a configuration, the gas sensor according to one aspect of the present invention solves the problems of the known gas sensors. Such problems include "increased difficulty in ensuring the airtightness and increased risks such as rupture of the elastic body and displacement of a contact point, due to swaging the rear end side of the outer tube (tubular body) to have a tapered shape". Furthermore, the gas sensor according to one aspect of the present invention includes the "position fixing portion that is in contact with the leading end surface of the elastic body (first end surface) and accordingly restricts movement of the first end surface toward the leading end side in the axial direction". The size and the like of each member are adjusted to satisfy Mathematical Expression (1). By adopting such a configuration, the gas sensor according to one aspect of the present invention can ensure airtightness of the interior of the tubular body within an allowable range and can effectively prevent occurrence of the displacement of a contact point.

Hereinafter, first, with reference to FIGS. 1 and 2, a gas sensor 1 will be described as an example of a gas sensor according to one aspect of the present invention. In the gas sensor 1, a spacer is employed to serve as a "position fixing portion that is in contact with a leading end surface of the elastic body (first end surface) and accordingly restricts movement of the first end surface toward a leading end side in an axial direction".

The gas sensor according to one aspect of the present invention does not necessarily include a spacer as the above-described position fixing portion. The gas sensor according to one aspect of the present invention may include no spacer but may include a ceramic housing (specifically, a ceramic housing that houses an element electrode of the sensor element and the element contact portion of the terminal metal fitting) as the position fixing portion. The gas sensor according to one aspect of the present invention may include a ceramic housing integrally formed with the above-described spacer as the position fixing portion. That is, the spacer and the ceramic housing may be integrally formed, and the gas sensor according to one aspect of the present invention may include such an integrally formed member as the position fixing portion. An example of a gas sensor including a ceramic housing as a position fixing portion instead of the spacer will be described later with reference to FIG. 4.

Configuration Examples

<Overall Outline of Gas Sensor>

FIG. 1 is a schematic cross-sectional view schematically illustrating an example of a configuration of the gas sensor 1 according to the present embodiment. That is, FIG. 1 schematically illustrates a configuration of a cross section of the gas sensor 1 parallel to and in contact with an axis in the longitudinal direction (axis line; i.e., a line along left-right direction in drawing). The gas sensor 1 is an example of a "gas sensor" of the present invention and can detect a concentration of a specific gas (specific gas concentration), such as oxygen and NOx, in a gas to be measured including an exhaust gas of an automobile. As illustrated in FIG. 1, the gas sensor 1 has an axis and extends along the longitudinal direction (axial direction). The gas sensor 1 has a leading end and a rear end as respective ends in the longitudinal direction. One end in the longitudinal direction is the leading end, and the other end is the rear end. In the example of FIG. 1, the gas sensor 1 is disposed such that a leading end of the gas sensor 1 is directed leftward and a rear end of the gas sensor 1 is directed rightward. That is, the left-right direction in FIG. 1 corresponds to the longitudinal direction (axial direction). In the present embodiment, the gas sensor 1 includes a sensor element 10, a tubular body 20, a terminal metal fitting 30, a lead wire 40, an elastic body 50, a ceramic housing 60, a spacer 70, and a protection cover 80. In the gas sensor 1, the sensor element 10 is surrounded by the tubular body 20 and the protection cover 80. The tubular body 20 and the protection cover 80 constitute a housing member (casing) that houses the sensor element 10 therein as a whole. The sensor element 10 is disposed coaxially with the tubular body 20 and the protection cover 80. The extending direction of the central axis of the sensor element 10 matches the axial direction of the gas sensor 1.

(Sensor Element)

The sensor element 10 is an example of a "sensor element" of the present invention and extends along the axial direction (left-right direction in FIG. 1). The sensor element 10 illustrated in FIG. 1 is an elongated flat plate-like (elongated plate-like) element. The sensor element 10 includes a detector (not illustrated) on the leading end side and an element electrode (not illustrated) on the rear end side. The leading end side of the sensor element 10 illustrated in FIG. 1 is coated with an outer porous layer. The outer porous layer serves as a protective layer that prevents occurrence of cracking in the element main body of the sensor element 10 due to adhesion of moisture or the like in a gas to be measured, for example.

In the gas sensor 1, the sensor element 10 is disposed such that the leading end side of the sensor element 10 faces the leading end of the gas sensor 1. For example, in one aspect of the sensor element 10, the gas to be measured that is introduced to an inside of the sensor element 10 is reduced or decomposed inside the sensor element 10 to generate oxygen ions. In the gas sensor 1 including the sensor element 10 described above, the concentration of the specific gas that is a detection target gas in the gas to be measured is obtained on the basis of the following fact: the amount of oxygen ions flowing inside the sensor element 10 is proportional to the concentration of the specific gas.

In the example illustrated in FIG. 1, the leading end side of the sensor element 10 is surrounded by the protection cover 80, and the rear end side protrudes into an outer tube 22. A substantially central portion between the leading end side and the rear end side is fixed inside a metal shell 21 by an annular mounting part 90. The fixed annular mounting part 90 hermetically seal between both ends.

(Annular Mounting Part)

In the example illustrated in FIG. 1, the annular mounting part 90 includes a first ceramic supporter 91, a green compact 92, and a second ceramic supporter 93. The first ceramic supporter 91 and the second ceramic supporter 93 are ceramic insulators. More specifically, a through hole (not illustrated) having a shape corresponding to a cross-sectional shape of the sensor elements 10 is provided at each of axial center positions of the first ceramic supporter 91 and the second ceramic supporter 93. The sensor element 10 is inserted through the through holes. Thus, the first ceramic supporter 91 and the second ceramic supporter 93 are annularly mounted on the sensor elements 10. The first ceramic supporter 91 is locked to the tapered surface of the metal shell 21 on the left side in the drawing.

On the other hand, the green compact 92 is obtained by molding a ceramic powder such as talc. As with the first ceramic supporter 91 and the second ceramic supporter 93, the sensor element 10 is inserted through the through hole, and accordingly two molded bodies (not illustrated) are annularly mounted on the sensor element 10. The two molded bodies thus annularly mounted around the sensor element 10 are disposed inside the metal shell 21, and then compressed and integrated to form the green compact 92. More specifically, the ceramic particles constituting the green compact 92 are surrounded by the first ceramic supporter 91, the second ceramic supporter 93, and the metal shell 21. The ceramic particles are densely filled in a space through which the sensor element 10 passes inside the metal shell 21. The compressed and filled green compact 92 achieves hermetic seal between the leading end side and the rear end side of the sensor element 10.

FIG. 1 illustrate the example in which the annular mounting part 90 includes the first ceramic supporter 91, the green compact 92, and the second ceramic supporter 93. However, in the gas sensor 1, the annular mounting part 90 does not necessarily include the first ceramic supporter 91, the green compact 92, and the second ceramic supporter 93. The gas sensor 1 illustrated in FIG. 1 includes the annular mounting part 90. The annular mounting part 90 fixes the sensor element 10 inside the metal shell 21 and hermetically seals between the leading end side and the rear end side of the sensor element 10.

(Tubular Body)

The tubular body 20 is an example of a "tubular body" of the present invention. The tubular body 20 is, for example, a tubular (e.g., cylindrical) metal member and includes an opening end. The sensor element 10 is disposed inside the tubular body 20. In the example illustrated in FIG. 1, the tubular body 20 includes the metal shell 21 having a tubular shape, the outer tube 22 having a tubular shape, and a fixing bolt 23, each of which is a metal member.

The metal shell 21 is a tubular (e.g., cylindrical) metal member. The metal shell 21 houses therein the sensor element 10 and the annular mounting part 90 for fixing, which is annularly mounted on the sensor element 10. That is, the metal shell 21 is further mounted around the annular mounting part 90 mounded around the sensor element 10. The metal shell 21 illustrated in FIG. 1 surrounds the sensor element 10 along the axial direction (longitudinal direction). In particular, the metal shell 21 surrounds a range excluding a part of each of the leading end side and the rear end side of the sensor element 10.

The outer tube 22 is a tubular (e.g., cylindrical) metal member. The outer tube 22 illustrated in FIG. 1 covers the periphery of the rear end of the sensor element 10, the ceramic housing 60 (terminal metal fitting 30), and the spacer 70.

An end (opening end) on the leading end side of the outer tube 22 is welded and fixed to an outer peripheral end on the rear end side of the metal shell 21. In addition, the elastic body 50 is disposed at the opening end on the rear end side of the outer tube 22 so as to seal the opening end. On the rear end side of the outer tube 22, a reduced diameter portion 221 is formed, which swages a part of the elastic body 50 for sealing the opening end on the rear end side from the periphery. The reduced diameter portion 221 is an example of a "reduced diameter portion" of the present invention. In the reduced diameter portion 221, the outer tube 22 is swaged from the outside in such a manner that the diameter of the outer tube 22 is reduced over the entire circumferential direction thereof. This causes the elastic body 50 to generate a reaction force directed outward in the radial direction, and thus the outer tube 22 is sealed.

In addition, the lead wire 40 is drawn out from an opening end on the rear end side of the outer tube 22 sealed by the elastic body 50 to the outside through a through hole (not illustrated) formed inside the elastic body 50. Outside air (atmospheric air) is introduced into the internal space of the outer tube 22 through between the coating and the metal wire (conductor) of the lead wire 40 (i.e., through the inside of the coating). Accordingly, a reference gas (air) atmosphere prevails in the internal space of the outer tube 22. The rear end of the sensor element 10 is disposed in the internal space of the outer tube 22 filled with the reference gas.

The fixing bolt 23 is an annular member used to fix the gas sensor 1 to the measurement position (attachment position) and is fixed coaxially with the metal shell 21. The fixing bolt 23 includes a threaded bolt portion and a handle portion held when the bolt portion is screwed. The bolt portion of the fixing bolt 23 is screwed into a nut provided at an attachment position of the gas sensor 1. For example, by screwing a bolt portion of the fixing bolt 23 into a nut (nut portion) provided in an exhaust pipe of an automobile, the gas sensor 1 is fixed to the exhaust pipe while the gas sensor 1 on the protection cover 80 side is exposed to the inside of the exhaust pipe.

As has been described above, the tubular body 20 illustrated in FIG. 1 includes the metal shell 21, the outer tube 22, and the fixing bolt 23. The tubular body 20 is configured as a tubular (e.g., cylindrical) member as a whole, particularly as a tubular member extending in the axial direction. That is, the tubular body 20 illustrated in FIG. 1 is a cylindrical member extending in the axial direction and including the metal shell 21 having a tubular shape, the outer tube 22, and the fixing bolt 23. The outer tube 22 has a tubular shape and is welded and fixed to the outer peripheral end on the rear end side of the metal shell 21. The fixing bolt 23 is disposed on the outer periphery on the leading end side of the metal shell 21. For example, the tubular body 20 and the gas sensor 1 (sensor element 10) are coaxial. The tubular body 20 has the leading end and the rear end as ends in the axial direction (longitudinal direction). The tubular body 20 is disposed such that the leading end of the tubular body 20 faces the leading end of the gas sensor 1. The tubular body 20 houses therein the sensor element 10, the annular mounting part 90 for fixing that is annularly mounted on the sensor element 10, the ceramic housing 60 (terminal metal fitting 30), and the spacer 70. The opening end on the rear end side of the tubular body 20 is sealed by the elastic body 50. The reduced diameter portion 221 for fixing the elastic body 50 for sealing the opening end of the tubular body 20 is formed on the rear end side of the tubular body 20 (outer tube 22). The reduced diameter portion 221 swages a part of the elastic body 50 from the periphery.

Note that, in the gas sensor 1, the tubular body 20 does not necessarily include the metal shell 21, the outer tube 22, and the fixing bolt 23. The tubular body 20 may not include the fixing bolt 23. The metal shell 21 and the outer tube 22 may be integrally formed. In the gas sensor 1, it is sufficient that the tubular body 20 be a tubular member in which the sensor element 10 is disposed and an opening end is formed.

(Terminal Metal Fitting)

The terminal metal fitting 30 is an example of a "terminal metal fitting" of the present invention. The terminal metal fitting 30 is a metal member (contact member) extending in the axial direction. In the gas sensor 1, the sensor element 10 (in particular, the element electrode) and the lead wire 40 are electrically connected via the terminal metal fitting 30. Although described in detail in FIG. 2, the terminal metal fitting 30 includes an element contact portion 31 electrically connected to the element electrode of the sensor element 10 on the leading end side. The terminal metal fitting 30 includes a lead wire holder 32 that crimps and holds the lead wire 40 on the rear end side.

(Ceramic Housing)

The ceramic housing 60 is an example of a "ceramic housing" of the present invention. The ceramic housing 60 is a ceramic member that houses the rear end side of the sensor element 10 (specifically, an element electrode provided on the rear end side of the sensor element 10) and the leading end side of the terminal metal fitting 30 (specifically, the element contact portion 31 described with reference to FIG. 2). That is, in the gas sensor 1 illustrated in FIG. 1, the sensor element 10 (in particular, the element electrode) and the terminal metal fitting 30 (in particular, the element contact portion 31) are electrically connected in the ceramic housing 60.

For example, the rear end side of the sensor element 10 including the element electrode is inserted into the ceramic housing 60 that houses the leading end side of the terminal metal fitting 30 (element contact portion 31). In the inserted state, the element electrode provided on the rear end side of the sensor element 10 and the leading end side of the terminal metal fitting 30 (element contact portion 31) are in contact with each other. The leading end side of the terminal metal fitting 30 (element contact portion 31) may be pinched and fixed between the ceramic housing 60 and the rear end side of the sensor element 10 including the element electrode. In this way, the element electrode of the sensor element 10 and the terminal metal fitting 30 may be electrically connected.

The position (e.g., a position in the axial direction) of the ceramic housing 60 in the tubular body 20 is fixed. In particular, the ceramic housing 60 is restrained from moving toward the leading end side. The position of the ceramic housing 60 in the axial direction in the tubular body 20 is fixed by, for example, a ceramic housing fixing member (not illustrated). In particular, the ceramic housing 60 is restrained from moving toward the leading end side. The ceramic housing fixing member may include, for example, a spring member and a fastening ring. The spring member presses the ceramic housing 60 inward in the radial direction inside the tubular body 20. The fastening ring allows the spring member to exert a spring force by pressing the spring member.

(Lead Wire)

The lead wire 40 is an example of a "lead wire" of the present invention. The lead wire 40 is electrically connected to the element electrode of the sensor element 10 via the terminal metal fitting 30, and extends outward from the opening end of the tubular body 20. Specifically, the lead wire 40 is electrically connected to the rear end side of the terminal metal fitting 30 (specifically, the lead wire holder 32 described with reference to FIG. 2) on the leading end side of the lead wire 40. The rear end side of the lead wire 40 extends outward from the opening end of the tubular body 20. As described above, the gap between the lead wire 40 and the tubular body 20 (outer tube 22) is sealed by elastic body 50.

For example, the lead wire 40 is inserted through a through hole (not illustrated) continuously provided in the elastic body 50 and the spacer 70. The end on the leading end side of the lead wire 40 is crimped and fixed to the rear end side of the terminal metal fitting 30 (lead wire holder 32). The end on the rear end side of the lead wire 40 is connected to an external device (controller), a power supply, or the like. As a result, the sensor element 10 (in particular, the element electrode of the sensor element 10) is electrically connected to an external device, a power supply, and the like through the terminal metal fitting 30 and the lead wire 40. Although FIG. 1 illustrates an example in which there are two terminal metal fittings 30 and two lead wires 40, this is merely for the sake of simplicity of illustration. In practice, the gas sensor 1 includes the terminal metal fittings 30 and the lead wires 40 as many as necessary for the above-described electrical connection.

(Elastic Body)

The elastic body 50 is an example of a "elastic body" of the present invention. The elastic body 50 is a member having elasticity, and includes, for example, rubber. The elastic body 50 is disposed so as to seal an opening end (in the example illustrated in FIG. 1, the opening end on the rear end side) of the tubular body 20. The lead wire 40 is inserted into the elastic body 50. Specifically, a through hole extending in the axial direction is formed inside the elastic body 50. For example, a plurality of through holes extending in the axial direction is formed. The lead wire 40 is housed in (inserted into) the through hole formed inside the elastic body 50. For example, each of a plurality of the lead wires

40 is housed in (inserted into) a corresponding one of a plurality of the through holes formed inside the elastic body 50.

The material of the elastic body 50 is, for example, fluororubber. Fluororubber has excellent properties in various aspects such as resistance and strength and is particularly excellent in heat resistance and oil resistance. Therefore, use of the elastic body 50 including fluororubber allows the gas sensor 1 to obtain and exert the following effect. For example, the sealing property of the elastic body 50 can be ensured even in a high-temperature environment as well as the detection accuracy of the gas concentration can be maintained and improved. Provided, however, that, in the gas sensor 1, the elastic body 50 does not necessarily contain fluororubber. The gas sensor 1 may suitably employ a material having elasticity as a material of the elastic body 50.

(Spacer)

The spacer 70 is an example of a "position fixing portion" of the present invention. That is, the spacer 70 is an example of a "position fixing portion that is in contact with the leading end surface of the elastic body (first end surface) and accordingly restricts the movement of the first end surface toward the leading end side in the axial direction". In other words, the gas sensor 1 includes the spacer 70 as the position fixing portion, and the spacer 70 is in contact with a leading end surface 53 (first end surface) of the elastic body 50 and accordingly restricts the movement of the leading end surface 53 toward the leading end side in the axial direction.

The spacer 70 is disposed on the rear end side with respect to the ceramic housing 60 in the axial direction of the gas sensor 1 (sensor element 10). The spacer 70 is restricted from moving in the axial direction (in particular, moving toward the leading end side) of by the ceramic housing 60. Specifically, the spacer 70 illustrated in FIG. 1 is disposed between the ceramic housing 60 and the elastic body 50 in the axial direction of the gas sensor 1 (sensor element 10). That is, the spacer 70 is sandwiched (interposed) between the ceramic housing 60 and the elastic body 50 inside the tubular body 20 (outer tube 22). That is, the end surface (leading end surface) on the leading end side of the spacer 70 is in contact with the end surface on the rear end side (rear end surface) of the ceramic housing 60. As described above, the position of the ceramic housing 60 in the axial direction is fixed, and particularly, the ceramic housing 60 is restrained from moving toward the leading end side. Therefore, the spacer 70 is restrained from moving toward the leading end side by the ceramic housing 60. As will be described later in detail with reference to FIG. 2, the leading end surface 53 is in contact with a rear end surface 71, where the leading end surface 53 is an end surface on the leading end side of the elastic body 50, and the rear end surface 71 is an end surface on the rear end side of the spacer 70. That is, the leading end surface 53 is restricted by the spacer 70 from moving in the axial direction, particularly, toward the leading end side.

The lead wire 40 is inserted into the spacer 70 illustrated in FIG. 1. For example, in the example illustrated in FIG. 1, the lead wire 40 and the terminal metal fitting 30 (in particular, the rear end of the terminal metal fitting 30 electrically connected to the lead wire 40) are housed in the spacer 70.

The spacer 70 includes, for example, a heat-resistant material. The spacer 70 including a heat-resistant material can prevent the occurrence of a situation in which the spacer 70 disposed on the leading end side with respect to the elastic body 50 in the axial direction incurs dissolution loss by heat generated from a heat source on the leading end side of the gas sensor 1. For example, with the spacer 70 interposed between the elastic body 50 and the ceramic housing 60, the temperature of the elastic body 50 can be prevented from excessively rising during the use of the gas sensor 1, or the like. That is, from the viewpoint of reducing heat transfer to the elastic body 50, the thermal conductivity of the spacer 70 is desirably low. However, while the temperature rise of the elastic body 50 can be reduced by the spacer 70, the temperature of the spacer 70 becomes high. Thus, the spacer 70 itself needs to have sufficient heat resistance. In view of the above, a heat-resistant material is used to form the spacer 70. In this way, it is possible to prevent the occurrence of a situation in which the spacer 70 itself incurs dissolution loss by heat generated from the heat source while reducing heat transfer from the above-described heat source to the elastic body 50.

Note that although FIG. 1 illustrates an example in which one member constitutes the spacer 70, the spacer 70 may include a plurality of constituent elements (constituent members). For example, the spacer 70 may include a spacer leading end-side portion disposed on the leading end side in the axial direction and a spacer rear end-side portion disposed on the rear end side. That is, the spacer 70 may have a multistage configuration (e.g., a two-stage configuration) including a spacer leading end-side portion and a spacer rear end-side portion.

When the spacer 70 is used to reduce the temperature rise of the elastic body 50 during the use of the gas sensor 1, each of the spacer leading end-side portion and the spacer rear end-side portion may be configured as follows. That is, as the material of the spacer leading end-side portion disposed on the leading end side in the axial direction, ceramic having a melting point higher than that of the resin is selected from the viewpoint of having heat resistance more excellent than that of the spacer rear end-side portion. Preferably, ceramic having a thermal conductivity of 32 W/m·K or less is selected. Such ceramic is suitable also from the viewpoint of heat insulation properties in addition to heat resistance. More preferably, alumina (thermal conductivity: 32 W/m·K) or steatite (thermal conductivity: 2 W/m·K) is selected. On the other hand, as the material of the spacer rear end-side portion in contact with the elastic body 50, a resin is selected rather than ceramic and the like from the viewpoint of having low thermal conductivity. Preferably, the resin used for the spacer rear end-side portion is polytetrafluoroethylene (PTFE; melting point of 327° C.) or perfluoroalkoxy alkane (PFA; melting point of 310° C.), both of which are fluororesin. These resins have heat resistance higher than that of the rubber elastic body 50, in addition to low thermal conductivity. As for PTFE, for example, a thermal conductivity thereof is 0.2 W/m·K, and a maximum temperature in continuous use thereof (the maximum temperature when use at the maximum temperature continues) is 260° C.

Although FIG. 1 illustrates an example in which the ceramic housing 60 and the spacer 70 are separate members, the ceramic housing 60 and the spacer 70 may be integrally formed. For example, the gas sensor 1 may include a member obtained by integrally forming the ceramic housing 60 and the spacer 70 as the "position fixing portion that is in contact with the leading end surface 53 (first end surface) of the elastic body 50 and accordingly restricts the movement of the leading end surface 53 toward the leading end side in the axial direction". In the gas sensor 1, the ceramic housing 60 may be formed integrally with the spacer 70.

(Protection Cover)

The protection cover 80 is a substantially cylindrical exterior member. The protection cover 80 protects a predetermined range on the leading end side, which is a portion of the sensor element 10 being in direct contact with the gas to be measured during use. The protection cover 80 illustrated in FIG. 1 surrounds at least a part of the leading end side of the tubular body 20 (metal shell 21) along the axial direction (longitudinal direction). The protection cover 80 extends beyond the leading end of the sensor element 10. For example, the protection cover 80 surrounds the sensor element 10 and a part of the leading end side of the tubular body 20 around the axis. The protection cover 80 has a leading end and a rear end as respective ends in the axial direction. The leading end of the protection cover 80 is disposed on the leading end side of the gas sensor 1 with respect to the leading end of the sensor element 10.

The protection cover 80 includes a plurality of through holes (not illustrated) through which gas can pass. The gas to be measured flowing into the protection cover 80 through the through hole is a direct detection target in the sensor element 10. The type, number, arrangement position, shape, and the like of the through holes provided in the protection cover 80 may be appropriately determined in consideration of how the gas to be measured flows into the protection cover 80.

In the example illustrated in FIG. 1, the protection cover 80 includes an inner cover 81 and an outer cover 82. The inner cover 81 has a bottomed tubular shape and covers the leading end of the sensor element 10. The outer cover 82 has a bottomed tubular shape and covers the inner cover 81. The inner cover 81 includes a first member 81B and a second member 81A. The inner cover 81 covers the periphery of at least a part of the leading end side of the sensor element 10 and the tubular body 20 (metal shell 21). The first member 81B extends along the axial direction from the outer wall of the leading end portion of the tubular body 20. The first member 81B further extends along the axial direction from a portion where the diameter decreases in the direction perpendicular to the axial direction in a region beyond the leading end of the tubular body 20. The second member 81A covers the periphery of a part of the leading end side of the first member 81B. The outer cover 82 covers the periphery of the inner cover 81.

A sensor element chamber is formed as a space surrounded by the inner cover 81, and a leading end of the sensor element 10 is disposed in the sensor element chamber. Openings are appropriately provided in the first member 81B and the second member 81A of the inner cover 81 and in the outer cover 82. With this configuration, the sensor element chamber is connected to a space outside the protection cover 80. Provided, however, that the configuration and shape of the protection cover 80 may not be limited to such an example. The configuration and shape of the protection cover 80 may be appropriately determined in accordance with an embodiment of the present invention.

As a material of the protection cover 80, for example, a metal material such as stainless steel (e.g., SUS) may be used. The protection cover 80 may be manufactured by appropriately molding a metal material. The protection cover 80 may be omitted from the configuration of the gas sensor 1.

<Details of Rear End Side of Gas Sensor>

Figure 2:
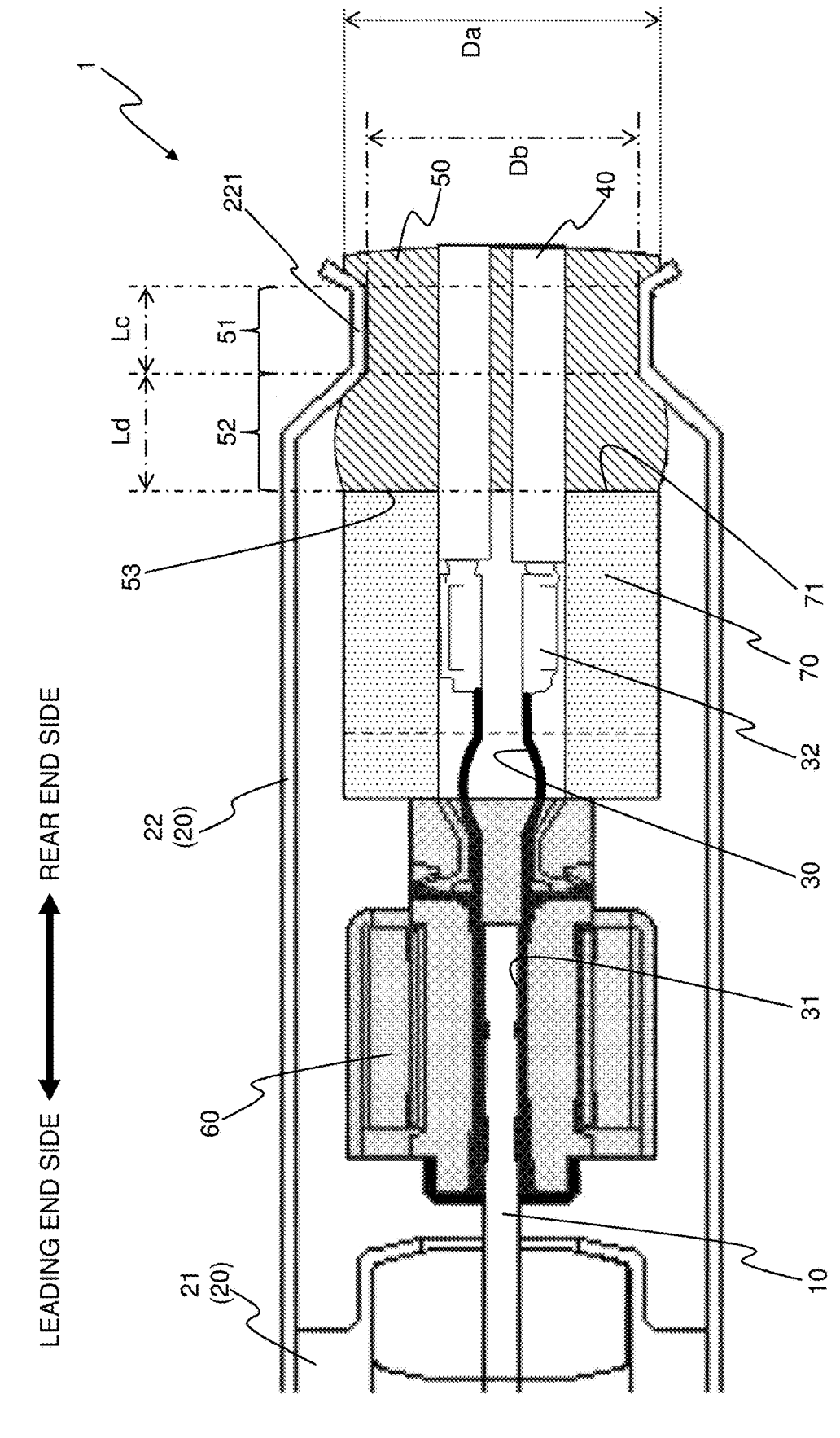
FIG. 2 is an enlarged cross-sectional view schematically illustrating main parts of the gas sensor in FIG. 1.

FIG. 2 is an enlarged cross-sectional view schematically illustrating main parts of the gas sensor in FIG. 1. Specifically, FIG. 2 illustrates details of the rear end side of the gas sensor 1. In FIG. 2, the left-right direction in the drawing corresponds to the axial direction (longitudinal direction) of the gas sensor 1 (sensor element 10). The left side in the drawing corresponds to the leading end side, and the right side in the drawing corresponds to the rear end side.

(Shape of Reduced Diameter Portion)

As illustrated in FIG. 2, the elastic body 50 includes a swaged portion 51 and a non-swaged portion 52. The swaged portion 51 is a portion swaged by the reduced diameter portion 221. The non-swaged portion 52 is a portion on the leading end side with respect to the swaged portion 51 in the axial direction. The non-swaged portion 52 can also be regarded as a portion that is on the leading end side with respect to the swaged portion 51 in the axial direction and is not swaged by the reduced diameter portion 221. The leading end surface 53 (first end surface) of the elastic body 50 is an end surface on the leading end side in the axial direction of the elastic body 50. The leading end surface 53 can also be regarded as an end surface on the leading end side of the non-swaged portion 52.

As described above, the gas sensor 1 includes the spacer 70 as the position fixing portion that "is in contact with the leading end surface of the elastic body (first end surface) and accordingly restricts the movement of the leading end surface toward the leading end side in the axial direction". That is, in the gas sensor 1 as illustrated in FIG. 2, the spacer 70 is in contact with the leading end surface 53 (first end surface) of the elastic body 50 and restricts the leading end surface 53 from moving in the axial direction, particularly, toward the leading end side. Specifically, in the example illustrated in FIG. 2, the rear end surface 71 (second end surface) is in contact with the leading end surface 53 (first end surface) of the elastic body 50. The rear end surface 71 is an end surface on the rear end side in the axial direction of the spacer 70. The spacer 70 is restricted from moving in the axial direction (in particular, moving toward the leading end side) by the ceramic housing 60. The position of the ceramic housing 60 in the tubular body 20 is fixed, and particularly, the position thereof in the axial direction is fixed. Therefore, the leading end surface 53 of the elastic body 50 is restricted from moving in the axial direction (in particular, moving toward the leading end side) by the spacer 70 (in particular, the rear end surface 71 of the spacer 70).

The lead wire 40 is inserted into the spacer 70. The spacer 70 illustrated in FIG. 2 houses therein the lead wire 40 and the lead wire holder 32 of the terminal metal fitting 30. For example, a through hole extending in the axial direction is formed inside the spacer 70. A plurality of through holes each extending in the axial direction may be formed inside the spacer 70, similarly to the inside of the elastic body 50. The lead wire 40 and the lead wire holder 32 of the terminal metal fitting 30 are housed in (inserted into) the through hole formed inside the spacer 70. Each of a plurality of the lead wires 40 and each of a plurality of lead wire holder 32 are housed in (inserted into) a corresponding one of a plurality of the through holes formed inside the spacer 70.

The terminal metal fitting 30 includes the element contact portion 31 electrically connected to the element electrode of the sensor element 10 (element electrode on the rear end side of the sensor element 10) on the leading end side. The terminal metal fitting 30 includes the lead wire holder 32 that crimps and holds the lead wire 40 on the rear end side. For example, the element contact portion 31 on the leading end side of the terminal metal fitting 30 is in contact with the element electrode of the sensor element 10 while being locked to the ceramic housing 60. The lead wire holder 32 on the rear end side of the terminal metal fitting 30 crimps and holds the lead wire 40. In the terminal metal fitting 30, a portion between the element contact portion 31 and the lead wire holder 32 may have a leaf spring shape. In the example illustrated in FIG. 2, the lead wire holder 32 of the terminal metal fitting 30 is housed in the spacer 70. That is, in the gas sensor 1, the lead wire holder 32 and the lead wire 40 are electrically connected in the spacer 70. The element contact portion 31 of the terminal metal fitting 30 is housed in the ceramic housing 60. That is, the element contact portion 31 and the element electrode of the sensor element 10 are electrically connected at the ceramic housing 60.

As illustrated in FIG. 2, a diameter of the tubular body 20 (outer tube 22) in the reduced diameter portion 221 is constant in the axial direction. A post-swaging diameter Db, which is a diameter of the swaged portion 51 being a portion of the elastic body 50 swaged by the reduced diameter portion 221, is constant in the axial direction.

As described above, in a known gas sensor in which the rear end side of the outer tube (corresponding to the "tubular body 20" of the gas sensor 1) swaged to have a tapered shape, stress tends to concentrate in the axial direction in the elastic body. This leads to increases of risks such as deterioration of the airtightness of the interior of the tubular body, rupture of the elastic body, and occurrence of the displacement of a contact point. On the other hand, in the gas sensor 1, the diameter of the reduced diameter portion 221 formed on the rear end side of the tubular body 20 and swaging the elastic body 50 is constant in the axial direction. The post-swaging diameter Db of the swaged portion 51 is also constant in the axial direction. Therefore, the gas sensor 1 can solve the problems of the known gas sensors. Such problems include "increased difficulty in ensuring the airtightness of the interior of the tubular body and increased risks such as rupture of the elastic body and occurrence of the displacement of a contact point, due to swaging the rear end side of the tubular body to have a tapered shape". The gas sensor 1 makes a diameter of the tubular body 20 in the reduced diameter portion 221 constant in the axial direction. This configuration reduces risks that known gas sensors face and that are raised by swaging a rear end side of the outer tube (tubular body) to have a tapered shape. Such risks include "deterioration of airtightness of the interior of the outer tube, rupture of the elastic body, and occurrence of the displacement of a contact point".

(Size and the Like of Each Member)

The gas sensor 1 makes the diameter of the tubular body 20 in the reduced diameter portion 221 constant in the axial direction, thereby making it possible to reduce risks. Such risks include "deterioration of airtightness of the interior of the outer tube, rupture of the elastic body, and occurrence of the displacement of a contact point" and are raised by swaging a rear end side of an outer tube (tubular body) to have a tapered shape. Furthermore, the gas sensor 1 can ensure airtightness of the interior of the tubular body 20 and effectively prevent occurrence of the displacement of a contact point by adjusting the size and the like of each member so as to satisfy a predetermined relational expression (specifically, the following Mathematical Expression (1)).

Specifically, in the gas sensor 1, a pre-swaging diameter Da, the post-swaging diameter Db, a length Lc of the reduced diameter portion, a length Ld of the non-swaged portion, a first area Ae, and a second area Af satisfy the following Mathematical Expression (1). That is, the gas sensor 1 satisfies:

$$0.038 \leq \{(Lc \times Af)/(Ae \times Ld)\} \times \qquad \text{Mathematical Expression (1)}$$
$$(1 - Db/Da) \leq 0.171.$$

The "pre-swaging diameter Da (unit: [mm])" represents the diameter of the elastic body 50 before being swaged from the periphery by the reduced diameter portion 221. In the example illustrated in FIG. 2, the pre-swaging diameter Da is a diameter of the rear end surface (end surface on the rear end side in the axial direction) of the elastic body 50. The "post-swaging diameter Db (unit: [mm])" represents a diameter of the portion of the elastic body 50 swaged by the reduced diameter portion 221, that is, a diameter of the swaged portion 51 of the elastic body 50. The "length Lc of the reduced diameter portion (unit: [mm])" represents a length of the reduced diameter portion 221 in the axial direction. The "length Ld of the non-swaged portion (unit: [mm])" represents a length in the axial direction of the "portion on the leading end side with respect to the swaged portion 51 in the axial direction" of the elastic body 50, that is, a length in the axial direction of the non-swaged portion 52 of the elastic body 50. The "first area Ae (unit: [mm$^2$])" represents an area of the "leading end surface 53 (first end surface) that is an end surface on the leading end side in the axial direction" of the elastic body 50. As described above, in the gas sensor 1, the spacer 70 serves as the "position fixing portion that is in contact with the first end surface of the elastic body and accordingly restricts the movement of the first end surface toward the leading end side in the axial direction". The leading end surface 53 of the elastic body 50 is in contact with the "second end surface that is an end surface on the rear end side in the axial direction of the position fixing portion". In the example illustrated in FIG. 2, the leading end surface 53 is in contact with the rear end surface 71 of the spacer 70. The area of the leading end surface 53 is the first area Ae. The "second area Af (unit: [mm$^2$])" represents an area of the "second end surface that is an end surface on the rear end side in the axial direction of the position fixing portion". In the gas sensor 1, the second area Af represents an area of the rear end surface 71 of the spacer 70 serving as the position fixing portion. Note that, in the following description, the unit of each of the pre-swaging diameter Da, the post-swaging diameter Db, the length Lc of the reduced diameter portion, the length Ld of the non-swaged portion, the first area Ae, and the second area Af will be omitted.

Here, in order to obtain good airtightness of the tubular body 20, it is important that the elastic body 50 (elastic body 50 that seals the opening end of the tubular body 20 and into which the lead wire 40 is inserted) is swaged from the periphery to apply an appropriate stress to the elastic body 50. A generally known technique for improving the airtightness of the interior of the tubular body 20 is to reduce the diameter of the reduced diameter portion 221 within a range in which excessive stress in the axial direction is not applied to the elastic body 50 at a portion of the elastic body 50 swaged from the periphery by the tubular body 20 (swaged portion 51). However, too large compressibility of the elastic body 50 obtained by reducing the diameter of the reduced diameter portion 221 leads to the excessively large deformation of the elastic body 50 in the axial direction. This results in difficulty in maintaining the position of the leading end surface 53 of the elastic body 50 within an allowable range by the position fixing portion (the spacer 70 in the gas sensor 1). For example, it becomes difficult to maintain the position of the leading end surface 53 by the spacer 70 (position fixing portion) within a range in which the displacement of a contact point does not occur.

Given these factors, the gas sensor 1 is configured such that an appropriate stress is applied to the non-swaged portion 52 of the elastic body 50. With this configuration, good airtightness of the interior of the tubular body 20 is ensured even when the diameter of the tubular body 20 and the post-swaging diameter Db in the reduced diameter portion 221 are each constant in the axial direction. That is, the gas sensor 1 converts the deformation in the axial direction of the elastic body 50 caused in accordance with the length Lc of the reduced diameter portion 221 and the amount of compression of the elastic body 50 into the deformation in the radial direction (deformation contributing to airtightness) with the spacer 70. In this way, the gas sensor 1 achieves good airtightness of the interior of the tubular body 20. In particular, by adjusting the size and the like of each member so as to satisfy Mathematical Expression (1), the gas sensor 1 can prevent the deformation of the elastic body 50 in the axial direction from becoming too large and maintain the position of the leading end surface 53 of the elastic body 50 within an allowable range by the spacer 70.

Specifically, a compressibility Rc of the elastic body 50 is expressed as "Re=1−Db/Da", where Da represents the pre-swaging diameter of the elastic body 50 and Db represents the post-swaging diameter of the elastic body 50 (swaged portion 51). Therefore, an amount of deformation Δ [mm] in the axial direction (in particular, an amount of deformation toward the leading end side) of the elastic body 50 can be expressed as "Δ=k×Lc×Rc", where k represents a constant determined by the material of the elastic body 50, Lc represents the length of the reduced diameter portion 221, and Rc represents the compressibility of the elastic body 50. Note that the elastic body 50 is deformed from the center position in the axial direction of the swaged portion 51 to both sides in the axial direction. Thus, the amount of deformation Δ of the elastic body 50 toward the leading end side in the axial direction is, for example, half ("½") of the amount of deformation of the elastic body 50 to both sides (both the leading end side and the rear end side) in the axial direction. Here, since the constant k includes "½", the amount of deformation of the elastic body 50 toward the leading end side in the axial direction can be expressed by A as can be obtained from "Δ=k×Lc×Rc". Therefore, a first parameter Pf, which is a ratio of the amount of deformation Δ in the axial direction to the length Ld of the non-swaged portion of the elastic body 50, can be expressed as "Pf=Δ/Ld". Then, as described above, since "Δ=k×Lc×Rc" and "Re=1−Db/Da" hold, the first parameter Pf can be expressed as "Pf={k×Lc×(1−Db/Da)}/Ld". The first parameter Pf is an index for evaluating the efficiency (conversion efficiency) of converting the stress applied to the elastic body 50 into deformation in the axial direction. The larger the value of the first parameter Pf, the higher the conversion efficiency of converting the stress applied to the elastic body 50 into deformation in the axial direction.

In the elastic body 50, a second parameter Ps, which is an index for evaluating the efficiency of converting deformation in the axial direction into deformation in the radial direction, can be expressed as follows. That is, the second parameter Ps can be expressed as a ratio of the second area Af being the area of the end surface on the rear end side of the spacer 70 (the rear end surface 71) to the first area Ae being the area of the end surface on the leading end side of the elastic body 50 (the leading end surface 53). Specifically, the second parameter Ps can be expressed as "Ps=Af/Ae". The larger the value of the second parameter Ps, the higher the efficiency of converting deformation in the axial direction into deformation in the radial direction in the elastic body 50.

AS described above, the larger the value of the first parameter Pf, the higher the conversion efficiency of converting the stress applied to the elastic body 50 into deformation in the axial direction. The larger the value of the second parameter Ps, the higher the efficiency of converting deformation in the axial direction into deformation in the radial direction in the elastic body 50. Therefore, a comprehensive parameter Pc, which is an index for evaluating deformation (the amount of deformation in the axial direction, the amount of deformation in the radial direction, balance between both, and the like) of the elastic body 50, can be expressed as "Pc=Pf×Ps". Then, since "Pf={k×Lc×(1−Db/Da)}/Ld" and "Ps=Af/Ae" hold, the comprehensive parameter Pc can be expressed as "Pc=k×{(Lc×Af)/(Ae×Ld)}×(1−Db/Da)".

The inventors of the present invention have confirmed through an experiment that "0.038k" or more of the value of the comprehensive parameter Pc contributes to ensuring airtightness of the tubular body 20 (corresponding to the "outer tube" in the known gas sensors), which is to be achieved by the elastic body 50.

In addition, the inventors of the present invention have confirmed through the experiment that "0.171k" or less of the value of the comprehensive parameter Pc contributes to avoiding a situation where "deformation and movement of the elastic body 50 in the axial direction are increased to cause displacement of a contact point". Specifically, in the gas sensor 1, when "the deformation in the axial direction of the elastic body 50 becomes excessive, and deformation in the axial direction is not fully converted into deformation in the radial direction with the spacer 70 (position fixing portion)", the spacer 70 itself moves in the axial direction (in particular, toward the leading end side). Therefore, the inventors of the present invention have obtained through the experiment the value of the comprehensive parameter Pc in a range in which the "position fixing portion (in the gas sensor 1, the spacer 70) can convert the deformation in the axial direction of the elastic body 50 into the deformation in the radial direction". Specifically, the inventors of the present invention have obtained through the experiment value of the comprehensive parameter Pc with which the positional movement (movement toward the leading end side) of the leading end surface 53 of the elastic body 50 is maintained within an allowable range. In the experiment, the gas sensor 1 in which the position of the spacer 70 (more precisely, the ceramic housing 60) in the axial direction is fixed "with force having a predetermined range of magnitude (adopted in general gas sensors)" was used. Details of the experiment will be described later. As a result, the inventors of the present invention have confirmed that the positional movement of the leading end surface 53 of the elastic body 50 can be maintained within an allowable range by setting the value of the comprehensive parameter Pc to "0.171k" or less.

As has been described above, the inventors of the present invention have confirmed through the experiment that the airtightness of the interior of the tubular body 20 ("outer tube" of the known gas sensors) can be ensured and occurrence of the displacement of a contact point can be effectively prevented when the value of the comprehensive parameter Pc falls within the following range. That is, the inventors of the present invention have confirmed that airtightness can be ensured, and occurrence of the displacement of a contact point can be effectively prevented by setting the value of the comprehensive parameter Pc is set to "0.038k" or more and "0.171k" or less. Here, since "Pc=k×{(Lc×Af)/(Ae×Ld)}×(1−Db/Da)" holds, the expression concerning the comprehensive parameter Pc can be rearranged to "0.038k≤k×{(Lc×Af)/(Ae×Ld)}×(1−Db/Da)≤0.171k". Since the "constant k" is common in each side of the relational expression, when the "constant k" is excluded from each side, "0.038≤{(Lc×Af)/(Ae×Ld)}×(1−Db/Da) ≤0.171" is obtained.

The gas sensor 1 satisfies the Mathematical Expression (1), that is, satisfies "0.038≤{(Lc×Af)/(Ae×Ld)}×(1−Db/Da)≤0.171". Therefore, the gas sensor 1 exerts an effect that the airtightness of the interior of the tubular body 20 can be ensured as well as occurrence of the displacement of a contact point can be effectively prevented, without swaging the rear end side of the tubular body 20 to have a tapered shape.

The inventors of the present invention have further confirmed the following points through the experiment. That is, the inventors have confirmed that the second parameter Ps is not improved even when the second area Af is made larger than the first area Ae, where the first area Ae is the area of the leading end surface 53 of the elastic body 50, and the second area Af is the area of the second end surface (in the gas sensor 1, the rear end surface 71 of the spacer 70) of the position fixing portion.

In addition, the inventors of the present invention have confirmed through an experiment that the upper limit of the compressibility Rc (=1−Db/Da) of the elastic body 50 is determined in accordance with the material of the elastic body 50. For example, when fluororubber is used as the material of the elastic body 50, the upper limit (compression limit) of the compressibility Rc is "0.25". The inventors of the present invention have also confirmed that the elastic body 50 is not ruptured (i.e., the risk of rupture of the elastic body 50 can be reduced) when the compressibility Rc of the elastic body 50 falls within a range of a compression limit (e.g., "0.25") or less determined in accordance with the material of the elastic body 50.

The inventors of the present invention have further confirmed the following matter as for the relationship among the pre-swaging diameter Da, the post-swaging diameter Db, the length Lc of the reduced diameter portion, the length Ld of the non-swaged portion, the first area Ae, and the second area Af. That is, the inventors have confirmed that the airtightness of the interior of the tubular body 20 is remarkably improved, and the movement of the leading end surface 53 can be remarkably well restrained when the pre-swaging diameter Da, the post-swaging diameter Db, the length Lc of the reduced diameter portion, the length Ld of the non-swaged portion, the first area Ae, and the second area Af satisfy the following Mathematical Expression (2). For example, in the gas sensor 1 satisfying the following expression:

$$0.050 \le \{(Lc \times Af)/(Ae \times Ld)\} \times \quad \text{Mathematical Expression (2)}$$
$$(1 - Db/Da) \le 0.094,$$

the airtightness of the interior of the tubular body 20 is remarkably good, and the movement of the leading end surface 53 can be remarkably well restrained.

Here, for example, in the gas sensor 1, when the leading end surface 53 of the elastic body 50 moves in the axial direction (in particular, moves toward the leading end side), the spacer 70 also moves in the axial direction. As a result, the ceramic housing 60 also moves in the axial direction. As described above, the terminal metal fitting 30 (in particular, the element contact portion 31) and the element electrode of the sensor element 10 are electrically connected in the ceramic housing 60. Thus, when the ceramic housing 60 moves in the axial direction, the electrical connection between the terminal metal fitting 30 and the element electrode of the sensor element 10 is likely to be lost. In other words, the displacement of a contact point is likely to occur. As such, a useful measure for preventing occurrence of the displacement of a contact point is to restrain the movement of the leading end surface 53 of the elastic body 50 (movement in the axial direction; in particular, movement toward the leading end side). Therefore, the gas sensor 1 that satisfies the above Mathematical Expression (2) can highly effectively prevent occurrence of the displacement of a contact point by remarkably well restraining the movement (in particular, movement in the axial direction) of the leading end surface 53 of the elastic body 50.

As has been described above, the gas sensor 1 satisfying Mathematical Expression (2) can ensuring remarkably good airtightness of the interior of the tubular body 20, restrains the movement of the leading end surface 53 of the elastic body 50 quite well, and effectively prevent occurrence of the displacement of a contact point quite well.

<Discussion on Elastic Body>

As has been described above, the gas sensor according to the present invention solves the problems of the known gas sensors of "increased risks such as deterioration of the airtightness of the interior of the outer tube, rupture of the elastic body, and occurrence of the displacement of a contact point, due to swaging the rear end side of the outer tube (tubular body) to have a tapered shape" by the following configuration. That is, the gas sensor according to the present invention makes a diameter of the tubular body (outer tube) in the reduced diameter portion constant in the axial direction, thereby reducing risks such as "deterioration of the airtightness of the interior of the outer tube, rupture of the elastic body, and occurrence of the displacement of a contact point". Therefore, in the gas sensor according to the present invention, the diameter of the tubular body in the reduced diameter portion is constant in the axial direction, and the diameter of the swaged portion of the elastic body (portion swaged by the reduced diameter portion; the post-swaging diameter Db) is constant in the axial direction. For example, the gas sensor 1 as has been described with reference to FIGS. 1 and 2 includes the tubular body 20 and the elastic body 50. The tubular body 20 has a diameter in the reduced diameter portion 221 being constant in the axial direction. The elastic body 50 has the post-swaging diameter Db of the swaged portion 51 being constant in the axial direction.

On the other hand, in the gas sensor according to the present invention, the diameter of the non-swaged portion of the elastic body (a portion on the leading end side with respect to the swaged portion in the axial direction, i.e., a portion that is not swaged by the reduced diameter portion) may vary in the axial direction. Hereinafter, a gas sensor according to one aspect of the present invention, including an elastic body in which "the non-swaged portion has a diameter varying in the axial direction" will be described with reference to FIGS. 3A to 3C.

Figures 3A, 3B, 3C:
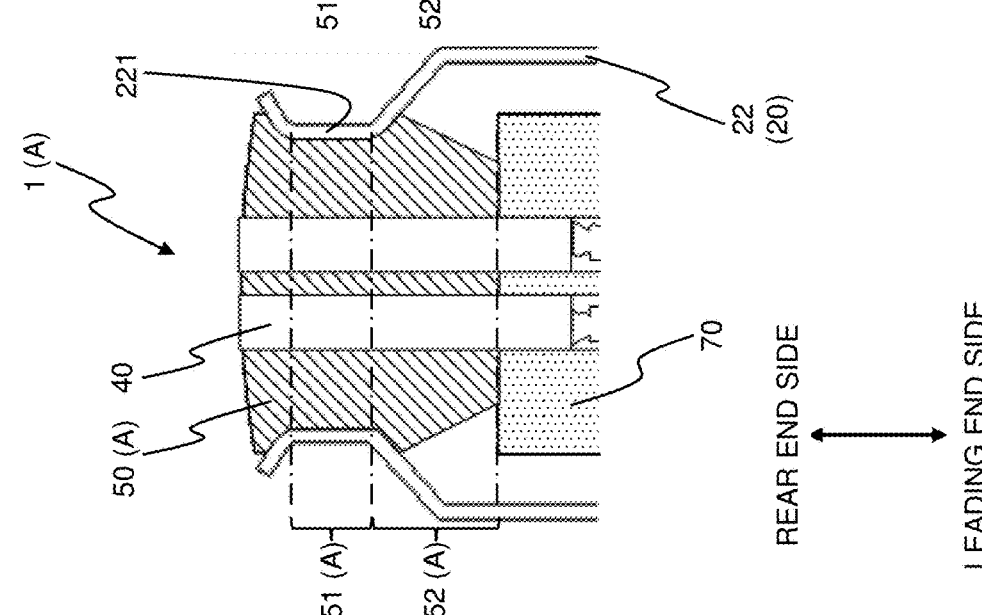
FIGS. 3A to 3C are enlarged cross-sectional views schematically illustrating elastic bodies according to Modified Examples 1 to 3.

FIGS. 3A to 3C are enlarged cross-sectional views schematically illustrating elastic bodies according to Modified Example 1 to 3. Specifically, FIGS. 3A to 3C are enlarged cross-sectional views schematically illustrating elastic bodies 50(A) to 50(C) according to Modified Examples 1 to 3, respectively. In FIG. 3 (each of FIGS. 3A to 3C), the up-down direction in the drawing of drawing corresponds to the axial direction (longitudinal direction) of each of gas sensors 1(A) to 1(C). The lower side in the drawing corresponds to the leading end side, and the upper side in the drawing corresponds to the rear end side.

Example of Non-Swaged Portion Having Smaller Diameter Toward Leading End in Axial Direction FIG. 3A is an enlarged cross-sectional view schematically illustrating a rear end side of the gas sensor 1(A) including the elastic body 50(A) as the "an elastic body that is disposed so as to seal an opening end of the tubular body 20 and into which the lead wire 40 is inserted", instead of the elastic body 50 as has been described with reference to FIGS. 1 and 2. In the gas sensor 1(A), the elastic body 50(A) is disposed so as to seal the opening end on the rear end side of the tubular body 20 (outer tube 22), and the lead wire 40 is inserted into the elastic body 50(A). The gas sensor 1(A) is the same as or similar to the gas sensor 1 except that the gas sensor 1(A) includes the elastic body 50(A) instead of the elastic body 50. Thus, description of the configuration other than the elastic body 50(A) is omitted.

Similarly to the elastic body 50, the elastic body 50(A) illustrated in FIG. 3A includes a swaged portion 51(A) and a non-swaged portion 52(A). The swaged portion 51(A) is a portion swaged by the reduced diameter portion 221. The non-swaged portion 52(A) is a portion on the leading end side with respect to the swaged portion 51(A) in the axial direction. The end surface on the leading end side in the axial direction (leading end surface) of the elastic body 50(A) is in contact with the end surface on the rear end side in the axial direction (rear end surface) of the spacer 70, and is accordingly restricted from moving in the axial direction (in particular, moving toward the leading end side) by the rear end surface.

As in the gas sensor 1, in the gas sensor 1(A), the post-swaging diameter Db is constant in the axial direction. The post-swaging diameter Db is a diameter of the swaged portion 51(A) that is a portion of the elastic body 50(A) swaged by the reduced diameter portion 221. A diameter of the tubular body 20 (outer tube 22) in the reduced diameter portion 221 is also constant in the axial direction.

A diameter of the non-swaged portion 52(A) of the elastic body 50(A) varies in the axial direction. Specifically, the diameter of the non-swaged portion 52(A) is smaller toward the leading end side in the axial direction. Provided, however, that the configuration of the gas sensor 1(A) is the same as or similar to the configuration of the gas sensor 1 as has been described with reference to FIGS. 1 and 2 except that the diameter of the non-swaged portion 52(A) is smaller toward the leading end side in the axial direction. Therefore, the gas sensor 1(A) can reduce risks by using the elastic body 50(A) in which the diameter of the non-swaged portion 52(A) is smaller toward the leading end side in the axial direction. Such risks include deterioration of airtightness of the interior of the tubular body 20, rupture of the elastic body 50(A), and occurrence of the displacement of a contact point.

Example 1 of Non-Swaged Portion Having Chamfered End on Leading End Side in Axial Direction FIG. 3B is an enlarged cross-sectional view schematically illustrating a rear end side of the gas sensor 1(B) including the elastic body 50(B) as the "an elastic body that is disposed so as to seal an opening end of the tubular body 20 and into which the lead wire 40 is inserted", instead of the elastic body 50 as has been described with reference to FIGS. 1 and 2. In the gas sensor 1(B), the elastic body 50(B) is disposed so as to seal the opening end on the rear end side of the tubular body 20 (outer tube 22), and the lead wire 40 is inserted into the elastic body 50(B). The gas sensor 1(B) is the same as or similar to the gas sensor 1 except that the gas sensor 1(B) includes the elastic body 50(B) instead of the elastic body 50. Thus, description of the configuration other than the elastic body 50(B) is omitted.

Similarly to the elastic body 50, the elastic body 50(B) illustrated in FIG. 3B includes a swaged portion 51(B) and a non-swaged portion 52(B). The swaged portion 51(B) is a portion swaged by the reduced diameter portion 221. The non-swaged portion 52(B) is a portion on the leading end side with respect to the swaged portion 51(B) in the axial direction. The end surface on the leading end side in the axial direction (leading end surface) of the elastic body 50(B) is in contact with the end surface on the rear end side in the axial direction (rear end surface) of the spacer 70, and is accordingly restricted from moving in the axial direction (in particular, moving toward the leading end side) by the rear end surface.

As in the gas sensor 1, in the gas sensor 1(B), the post-swaging diameter Db is constant in the axial direction. The post-swaging diameter Db is a diameter of the swaged portion 51(B) that is a portion of the elastic body 50(B) swaged by the reduced diameter portion 221. A diameter of the tubular body 20 (outer tube 22) in the reduced diameter portion 221 is also constant in the axial direction.

A diameter of the non-swaged portion 52(B) of the elastic body 50(B) varies in the axial direction. Specifically, the end on the leading end side (leading end) of the non-swaged portion 52(B) is chamfered. In the example illustrated in FIG. 3B, the leading end of the non-swaged portion 52(B) is chamfered, and the diameter of the leading end of the non-swaged portion 52(B) continuously varies in the axial direction. Provided, however, that the configuration of the gas sensor 1(B) is the same as or similar to the configuration of the gas sensor 1 as has been described with reference to FIGS. 1 and 2 except that the leading end of the non-swaged portion 52(B) is chamfered. Therefore, the gas sensor 1(B) can reduce risks by using the elastic body 50(B) in which the leading end of the non-swaged portion 52(B) is chamfered. Such risks include deterioration of airtightness of the interior of the tubular body 20, rupture of the elastic body 50(B), and occurrence of the displacement of a contact point.

Example 2 of Non-Swaged Portion Having Chamfered End on Leading End Side in Axial Direction FIG. 3C is an enlarged cross-sectional view schematically illustrating a rear end side of the gas sensor 1(C) including the elastic body 50(C) as the "an elastic body that is disposed so as to seal an opening end of the tubular body 20 and into which the lead wire 40 is inserted", instead of the elastic body 50 as has been described with reference to FIGS. 1 and 2. In the gas sensor 1(C), the elastic body 50(C) is disposed so as to seal the opening end on the rear end side of the tubular body 20 (outer tube 22), and the lead wire 40 is inserted into the elastic body 50(C). The gas sensor 1(C) is the same as or similar to the gas sensor 1 except that the gas sensor 1(C) includes the elastic body 50(C) instead of the elastic body 50. Thus, description of the configuration other than the elastic body 50(C) is omitted.

Similarly to the elastic body 50, the elastic body 50(C) illustrated in FIG. 3C includes a swaged portion 51(C) and a non-swaged portion 52(C). The swaged portion 51(C) is a portion swaged by the reduced diameter portion 221. The non-swaged portion 52(C) is a portion on the leading end side with respect to the swaged portion 51(C) in the axial direction. The end surface on the leading end side in the axial direction (leading end surface) of the elastic body 50(C) is in contact with the end surface on the rear end side in the axial direction (rear end surface) of the spacer 70, and is accordingly restricted from moving in the axial direction (in particular, moving toward the leading end side) by the rear end surface.

As in the gas sensor 1, in the gas sensor 1(C), the post-swaging diameter Db is constant in the axial direction. The post-swaging diameter Db is a diameter of the swaged portion 51(C) that is a portion of the elastic body 50(C) swaged by the reduced diameter portion 221. A diameter of the tubular body 20 (outer tube 22) in the reduced diameter portion 221 is also constant in the axial direction.

A diameter of the non-swaged portion 52(C) of the elastic body 50(C) varies in the axial direction. Specifically, the end on the leading end side (leading end) of the non-swaged portion 52(C) is chamfered. In the example illustrated in FIG. 3C, the leading end of the non-swaged portion 52(C) is chamfered, and the diameter of the leading end of the non-swaged portion 52(C) discontinuously varies in the axial direction. Provided, however, that the configuration of the gas sensor 1(C) is the same as or similar to the configuration of the gas sensor 1 as has been described with reference to FIGS. 1 and 2 except that the leading end of the non-swaged portion 52(C) is chamfered. Therefore, the gas sensor 1(C) can reduce risks by using the elastic body 50(C) in which the leading end of the non-swaged portion 52(C) is chamfered. Such risks include deterioration of airtightness of the interior of the tubular body 20, rupture of the elastic body 50(C), and occurrence of the displacement of a contact point.

As has been described with reference to FIG. 3 (FIGS. 3A to 3C), in the gas sensors 1(A) to 1(C), the respective diameters of the non-swaged portions 52(A) to 52(C) of the elastic bodies 50(A) to 50(C) vary in the axial direction. It is sufficient that the gas sensor according to the present invention include the tubular body in which "the diameter of the reduced diameter portion is constant in the axial direction" and the swaged portion (a portion of the elastic body swaged by the reduced diameter portion) "having a constant diameter in the axial direction". The shape of the non-swaged portion of the elastic body is not particularly limited. As illustrated in FIG. 3 (FIGS. 3A to 3C), in the gas sensor according to the present invention, the diameter of the non-swaged portion of the elastic body (a portion on the leading end side with respect to the swaged portion in the axial direction, i.e., a portion that is not swaged by the reduced diameter portion) may vary in the axial direction. The gas sensor according to the present invention exerts an effect that risks can be reduced by using the elastic body in which the diameter of the non-swaged portion varies in the axial direction. Such risks include deterioration of the airtightness of the interior of the tubular body, rupture of the elastic body, and occurrence of the displacement of a contact point.

As has been described above, the gas sensor according to the present invention may include the elastic body in which the diameter of the non-swaged portion varies in the axial direction. For example, in the gas sensor according to the present invention, the diameter of the non-swaged portion may be smaller toward the leading end side in the axial direction. Moreover, the end on the leading end side in the axial direction (leading end) of the non-swaged portion may be chamfered.

Here, as described above, in the gas sensor according to the present invention, the non-swaged portion of the elastic body is a portion on the leading end side in the axial direction with respect to the "swaged portion which is a portion of the elastic body swaged by the reduced diameter portion". The gas sensor according to the present invention includes the position fixing portion that "is in contact with the leading end surface of the elastic body (first end surface) and accordingly restricts the movement of the first end surface toward the leading end side in the axial direction". Therefore, in the gas sensor according to the present invention, the leading end surface that is the end surface on the leading end side of the non-swaged portion (i.e., the first end surface of the elastic body) is in contact with the position fixing portion. In particular, the leading end surface of the non-swaged portion is in contact with a rear end surface that is an end surface on the rear end side of the position fixing portion (second end surface).

Therefore, the gas sensor according to the present invention can achieve the following effects by reducing the contact area between the leading end surface of the non-swaged portion (first end surface) and the position fixing portion (in particular, the rear end surface of the position fixing portion; second end surface). That is, the gas sensor according to the present invention exerts an effect that heat transfer from the heat source on the leading end side of the gas sensor to the elastic body via the position fixing portion can be reduced, that is, heat transfer from the position fixing portion to the elastic body can be reduced. The gas sensor according to the present invention can reduce heat transfer from the position fixing portion to the elastic body and prevent thermal deterioration of the elastic body by reducing the contact area between the non-swaged portion on the leading end side of the elastic body and the position fixing portion. In the gas sensor according to the present invention, the contact area between the non-swaged portion on the leading end side of the elastic body and the position fixing portion may be reduced by, for example, reducing the diameter of the non-swaged portion toward the leading end side in the axial direction or chamfering the leading end of the non-swaged portion.

<Discussion on Position Fixing Portion>

All of the gas sensors 1 and 1(A) to 1(C) as has been described with reference to FIGS. 1, 2 and 3A to 3C include the spacer 70 as the "position fixing portion that is in contact with a first end surface, which is an end surface on a leading end side in the axial direction of the elastic body and accordingly restricts the movement of the first end surface toward the leading end side in the axial direction". However, the gas sensor according to the present invention does not necessarily include the spacer 70 as the above-described position fixing portion. The gas sensor according to the present invention may employ a ceramic housing (specifically, a ceramic housing that houses an element electrode of the sensor element and the element contact portion of the terminal metal fitting) as the above-described position fixing portion. Hereinafter, as a gas sensor according to one aspect of the present invention, an example of a gas sensor having a ceramic housing as a position fixing portion instead of the spacer will be described with reference to FIG. 4.

Figure 4:
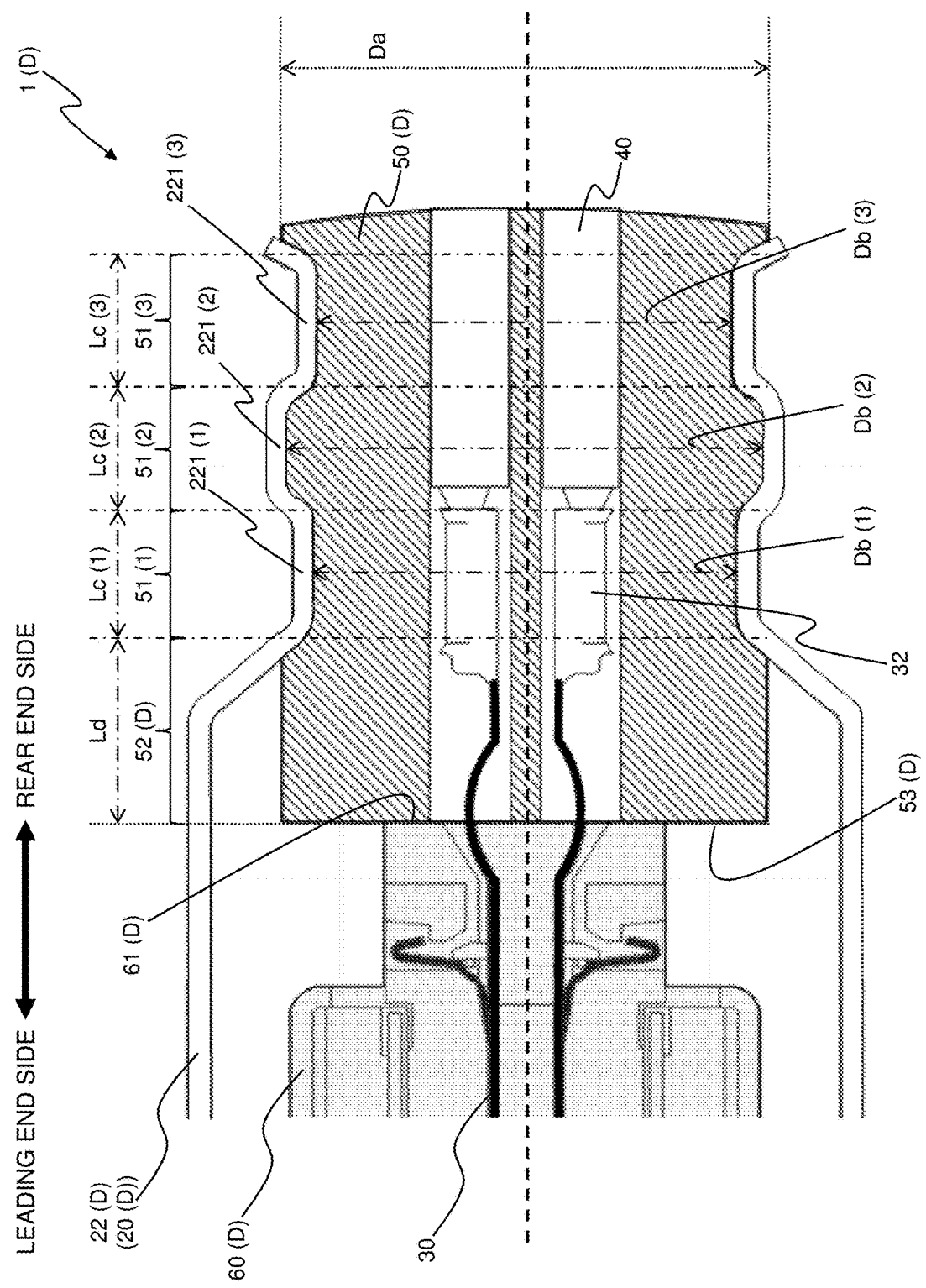
FIG. 4 is an enlarged cross-sectional view schematically illustrating main parts of a gas sensor according to Modified Example 4.

FIG. 4 is an enlarged cross-sectional view schematically illustrating main parts of a gas sensor 1(D) according to Modified Example 4. Specifically, FIG. 4 illustrates details of the rear end side of the gas sensor 1(D). In FIG. 4, the left-right direction in the drawing corresponds to the axial direction (longitudinal direction) of the gas sensor 1(D). The left side in the drawing corresponds to the leading end side, and the right side in the drawing corresponds to the rear end side. The gas sensor 1(D) illustrated in FIG. 4 is the same as or similar to the gas sensor 1 except for the following points. That is, the gas sensor 1(D) is the same as or similar to the gas sensor 1 except that the gas sensor 1(D) includes a ceramic housing 60(D), a tubular body 20(D), and an elastic body 50(D) instead of the ceramic housing 60, the tubular body 20, and the elastic body 50. Therefore, in the following description, description of components other than the ceramic housing 60(D), the tubular body 20(D), and the elastic body 50(D) is omitted.

As illustrated in FIG. 4, the gas sensor 1(D) does not include the spacer 70 included in the gas sensor 1. The gas sensor 1(D) includes the ceramic housing 60(D) instead of the spacer 70, as the "position fixing portion that is in contact with the first end surface, which is the end surface on the leading end side in the axial direction of the elastic body and accordingly restricts the movement of the first end surface toward the leading end side in the axial direction". That is, the gas sensor 1(D) includes the ceramic housing 60(D) that "is in contact with a leading end surface 53(D) (first end surface) of the elastic body 50(D) and accordingly restricts the movement of the leading end surface 53(D) toward the leading end side in the axial direction". The ceramic housing 60(D) is an example of a "position fixing portion" of the present invention.

Specifically, in the gas sensor 1(D) illustrated in FIG. 4, the leading end surface 53(D) (first end surface) of the elastic body 50(D) is in contact with a rear end surface 61(D) (an end surface on the rear end side in the axial direction, i.e., the second end surface) of the ceramic housing 60(D). Similarly to the ceramic housing 60, the position (e.g., a position in the axial direction) of the ceramic housing 60(D) in the tubular body 20(D) is fixed. In particular, the ceramic housing 60(D) is restrained from moving toward the leading end side. For example, the position of the ceramic housing 60(D) in the axial direction in the tubular body 20(D) is fixed by a ceramic housing fixing member (not illustrated). In particular, the ceramic housing 60(D) is restrained from moving toward the leading end side. The ceramic housing fixing member may include, for example, a spring member and a fastening ring. The spring member presses the ceramic housing 60(D) inward in the radial direction inside the tubular body 20(D). The fastening ring allows the spring member to exert a spring force by pressing the spring member.

Therefore, the leading end surface 53(D) of the elastic body 50(D) is restricted from moving in the axial direction (in particular, moving toward the leading end side) by the rear end surface 61(D) of the ceramic housing 60(D). In short, the gas sensor 1(D) includes the ceramic housing 60(D) that is in contact with the leading end surface 53(D) of the elastic body 50(D) (end surface of the elastic body on the leading end side in the axial direction; first end surface)

and accordingly restricts the movement of the leading end surface 53(D) toward the leading end side in the axial direction.

The gas sensor 1(D) suitably converts the deformation in the axial direction of the elastic body 50(D) into the deformation in the radial direction with the ceramic housing 60(D) as the position fixing portion by adjusting the size and the like of each member so as to satisfy the above-described Mathematical Expression (1). Therefore, the gas sensor 1(D) exerts an effect that the airtightness of the interior of the tubular body 20(D) can be ensured, and occurrence of the displacement of a contact point can be effectively prevented. Mathematical Expression (1) that the size and the like of each member of the gas sensor 1(D) satisfy will be described later in detail.

<Discussion on the Number of Reduced Diameter Portions>

All of the gas sensors 1 and 1(A) to 1(C) as has been described with reference to FIGS. 1, 2 and 3A to 3C includes the tubular body including "one" "reduced diameter portion configured to swage a part of an elastic body configured to seal an opening end on a rear end side of a tubular body from a periphery". However, the gas sensor according to the present invention does not necessarily include "one" "reduced diameter portions configured to swage a part of an elastic body configured to seal an opening end on a rear end side of a tubular body from a periphery" formed in the tubular body. The gas sensor according to the present invention may include the tubular body including "a plurality of" "reduced diameter portions configured to swage a part of an elastic body configured to seal an opening end on a rear end side of a tubular body from a periphery".

That is, in the gas sensor 1(D) illustrated in FIG. 4, a plurality of reduced diameter portions swaging a part of the elastic body 50(D) from the periphery are formed on the rear end side of the tubular body 20(D) (specifically, an outer tube 22(D)). Specifically, reduced diameter portions 221(1) to 221(3) are formed. A diameter of the tubular body 20(D) in each of the reduced diameter portions 221(1) to 221(3) is constant in the axial direction. In other words, the diameter of the tubular body 20(D) in the reduced diameter portion 221(1) is constant in the axial direction, the diameter of the tubular body 20(D) in the reduced diameter portion 221(2) is constant in the axial direction, and the diameter of the tubular body 20(D) in the reduced diameter portion 221(3) is constant in the axial direction.

The elastic body 50(D) includes swaged portions 51(1) to 51(3) and a non-swaged portion 52(D). The swaged portions 51(1) to 51(3) are portions swaged by the respective reduced diameter portions 221(1) to 221(3). The non-swaged portion 52(D) is a portion on the leading end side with respect to the swaged portions 51(1) to 51(3) in the axial direction.

The swaged portions 51(1) to 51(3) are portions swaged by the respective reduced diameter portions 221(1) to 221(3) of the elastic body 50(D). Specifically, the swaged portion 51(1) is a portion of the elastic body 50(D) swaged from the periphery by the reduced diameter portion 221(1). The swaged portion 51(2) is a portion of the elastic body 50(D) swaged from the periphery by the reduced diameter portion 221(2). The swaged portion 51(3) is a portion of the elastic body 50(D) swaged from the periphery by the reduced diameter portion 221(3).

The non-swaged portion 52(D) is a portion on the leading end side with respect to any of the swaged portions 51(1) to 51(3) in the axial direction. In the example illustrated in FIG. 4, the non-swaged portion 52(D) is a portion on the leading end side with respect to the swaged portion 51(1) disposed on the most leading end side among the swaged portions 51(1) to 51(3). The non-swaged portion 52(D) can also be regarded as a portion that is on the leading end side with respect to the swaged portions 51(1) to 51(3) in the axial direction and is not swaged by the reduced diameter portion.

Post-swaging diameters Db(1) to Db(3), which are respectively the diameters of the swaged portion 51(1) to 51(3), are each constant in the axial direction. That is, the post-swaging diameter Db(1), which is the diameter of the swaged portion 51(1), is constant in the axial direction. The post-swaging diameter Db(2), which is the diameter of the swaged portion 51(2), is constant in the axial direction. The post-swaging diameter Db(3), which is the diameter of the swaged portion 51(3), is constant in the axial direction.

As has been described above, the diameter of the tubular body 20(D) in each of the reduced diameter portions 221(1) to 221(3) is constant in the axial direction. The post-swaging diameters Db(1) to Db(3), which are respectively the diameters of the swaged portion 51(1) to 51(3), are each constant in the axial direction. Therefore, the gas sensor 1(D) can solve the problems of the known gas sensors. Such problems include "increased risks such as deterioration of the airtightness of the interior of the outer tube, rupture of the elastic body, and occurrence of the displacement of a contact point due to swaging the rear end side of the outer tube (tubular body) to have a tapered shape". That is, the gas sensor 1(D) exerts an effect that the risks described above can be reduced by making the diameter of the tubular body 20(D) in each of the reduced diameter portions 221(1) to 221(3) constant in the axial direction.

The gas sensor 1(D) includes the ceramic housing 60(D) as the "position fixing portion that is in contact with the first end surface, which is the end surface on the leading end side in the axial direction of the elastic body, and accordingly restricts the movement of the first end surface toward the leading end side in the axial direction". In the gas sensor 1(D), a total of the comprehensive parameters Pc respectively calculated for a plurality of the reduced diameter portions 221 (i.e., the reduced diameter portions 221(1) to 221(3)) is "0.038k" or more and "0.171k" or less.

Specifically, a total of comprehensive parameters Pc(1), Pc(2) and Pc(3) respectively calculated for a plurality of the reduced diameter portions 221(1), 221(2) and 221(3) is "0.038k" or more and "0.171k" or less. That is, the sum of the comprehensive parameter Pc(1), the comprehensive parameter Pc(2), and the comprehensive parameter Pc(3) is "0.038k" or more and "0.171k" or less.

The comprehensive parameter Pc(1) calculated for the reduced diameter portion 221(1) is expressed as follows by using the pre-swaging diameter Da, the post-swaging diameter Db(1), a length Lc(1) of the reduced diameter portion, the length Ld of the non-swaged portion, the first area Ae, and the second area Af. That is, the comprehensive parameter Pc(1) is expressed as "$Pc(1)=k \times \{(Lc(1) \times Af)/(Ae \times Ld)\} \times (1-Db(1)/Da)$".

As in the gas sensor 1, the pre-swaging diameter Da represents the diameter of the elastic body 50(D) before being swaged from the periphery by the reduced diameter portion 221. In the example illustrated in FIG. 4, the pre-swaging diameter Da is a diameter of the rear end surface (end surface on the rear end side in the axial direction) of the elastic body 50(D). The post-swaging diameter Db(1) represents a diameter of the portion of the elastic body 50(D) swaged by the reduced diameter portion 221(1), that is, a diameter of the swaged portion 51(1) of the elastic body 50(D). The length Lc(1) of the reduced diameter portion represents a length of the reduced diameter portion 221(1) in the axial direction. The length Ld of the non-swaged portion represents a length in the axial direction of the "portion on the leading end side with respect to any of the swaged portions 51(1) to 51(3) in the axial direction" of the elastic body 50(D), that is, a length in the axial direction of the non-swaged portion 52(D) of the elastic body 50(D). The first area Ae represents an area of the leading end surface 53(D) that is an "end surface on the leading end side in the axial direction" of the elastic body 50(D). The second area Af represents an area of the "second end surface that is an end surface on the rear end side in the axial direction of the position fixing portion". In the gas sensor 1(D), the second area Af represents an area of the rear end surface 61(D) of the ceramic housing 60(D) serving as the position fixing portion.

Similarly, the comprehensive parameter Pc(2) calculated for the reduced diameter portion 221(2) is expressed as follows by using the pre-swaging diameter Da, the post-swaging diameter Db(2), a length Lc(2) of the reduced diameter portion, the length Ld of the non-swaged portion, the first area Ae, and the second area Af. That is, the comprehensive parameter Pc(2) is expressed as "$Pc(2)=k \times \{(Lc(2) \times Af)/(Ae \times Ld)\} \times (1-Db(2)/Da)$". The post-swaging diameter Db(2) represents a diameter of the portion of the elastic body 50(D) swaged by the reduced diameter portion 221(2), that is, a diameter of the swaged portion 51(2) of the elastic body 50(D). The length Lc(2) of the reduced diameter portion represents a length of the reduced diameter portion 221(2) in the axial direction.

The comprehensive parameter Pc(3) calculated for the reduced diameter portion 221(3) is expressed as follows by using the pre-swaging diameter Da, the post-swaging diameter Db(3), a length Lc(3) of the reduced diameter portion, the length Ld of the non-swaged portion, the first area Ae, and the second area Af. That is, the comprehensive parameter Pc(3) is expressed as "$Pc(3)=k \times \{(Lc(3) \times Af)/(Ae \times Ld)\} \times (1-Db(3)/Da)$". The post-swaging diameter Db(3) represents a diameter of the portion of the elastic body 50(D) swaged by the reduced diameter portion 221(3), that is, a diameter of the swaged portion 51(3) of the elastic body 50(D). The length Lc(3) of the reduced diameter portion represents a length of the reduced diameter portion 221(3) in the axial direction.

Note that, as described above, the following sizes and the like of the reduced diameter portions 221(1), 221(2) and 221(3) (in other words, the swaged portions 51(1), 51(2) and 51(3)) are common. That is, the pre-swaging diameter Da of the elastic body 50(D), the length Ld of the non-swaged portion 52(D), the area of the leading end surface 53(D) of the elastic body 50(D) (first area Ae), and the area of the rear end surface 61(D) of the ceramic housing 60(D) (second area Af) are common.

The inventors of the present invention conducted an experiment by using the gas sensor that includes the tubular body including a plurality of "reduced diameter portions configured to swage a part of an elastic body configured to seal an opening end on a rear end side of a tubular body from a periphery". As a result, the inventors have confirmed the following matter. That is, the inventors have confirmed that when the size or the like of each member of the gas sensor satisfies the following condition, the airtightness of the interior of the tubular body can be ensured, and occurrence of the displacement of a contact point can be effectively prevented. That is, the inventors have confirmed that when the total of comprehensive parameters Pc respectively calculated for a plurality of the reduced diameter portions is "0.038k" or more and "0.171k" or less, the airtightness of the interior of the tubular body can be ensured, and occurrence of the displacement of a contact point can be effectively prevented.

In the gas sensor 1(D), the reduced diameter portions 221(1) to 221(3) are formed on the rear end side of the tubular body 20(D), and the total of the comprehensive parameters Pc(1), Pc(2) and Pc(3) is "0.038k" or more and "0.171k" or less. In short, in the gas sensor 1(D), a total of "{(Lc×Af)/(Ae×Ld)}×(1−Db/Da)" respectively calculated for the reduced diameter portions 221(1) to 221(3) is "0.038" or more and "0.171" or less.

Therefore, the gas sensor 1(D) in which the total of the comprehensive parameters Pc(1) to Pc(3) respectively calculated for the reduced diameter portions 221(1) to 221(3) is "0.038k" or more and "0.171k" or less exerts the following effect. That is, the gas sensor 1(D) exerts an effect that the airtightness of the interior of the tubular body 20(D) can be ensured, and occurrence of the displacement of a contact point can be effectively prevented.

In the gas sensor 1(D) in which the reduced diameter portions 221(1) to 221(3) are formed on the rear end side of the tubular body 20(D), the total of the comprehensive parameters Pc(1) to Pc(3) respectively calculated for each of the reduced diameter portions 221(1) to 221(3) may fall within the following range. That is, the total of the comprehensive parameters Pc(1) to Pc(3) may be "0.050k" or more and "0.094k" or less.

In the gas sensor including a plurality of the reduced diameter portions on the rear end side of the tubular body, the total value of the respective comprehensive parameters Pc for a plurality of the reduced diameter portions is set to fall within the following range. With this setting, remarkably good airtightness of the interior of the tubular body can be ensured, and occurrence of the displacement of a contact point can be highly effectively prevented. That is, when the total value of the respective comprehensive parameters Pc for a plurality of the reduced diameter portions is set to "0.050k" or more and "0.094k" or less, the gas sensor can ensure remarkably good airtightness of the interior of the tubular body and highly effectively prevent occurrence of the displacement of a contact point. Therefore, the gas sensor 1(D) having the total of the comprehensive parameters Pc(1) to Pc(3) set to "0.050k" or more and "0.094k" or less can ensure remarkably good airtightness of the interior of the tubular body and can highly effectively prevent occurrence of the displacement of a contact point.

[Characteristics]

As described above, the gas sensor according to the present invention can detect a specific gas concentration of a gas to be measured and includes the sensor element, the tubular body, the terminal metal fitting, the lead wire, and the elastic body. For example, the gas sensor 1 includes the sensor element 10, the tubular body 20, the terminal metal fitting 30, the lead wire 40, and the elastic body 50. The sensor element 10 extends in the axial direction (longitudinal direction) and includes the detector on the leading end side and the element electrode on the rear end side. The sensor element 10 is disposed inside the tubular body 20, and the opening end is formed at the tubular body 20. The lead wire 40 is electrically connected to the element electrode of the sensor element 10 via the terminal metal fitting 30 extending in the axial direction. The lead wire 40 extends outward from an opening end (e.g., the opening end on the rear end side) of the tubular body 20. The elastic body 50 is disposed so as to seal an opening end (e.g., the opening end on the rear end side) of the tubular body 20, and the lead wire 40 is inserted into the elastic body 50.

The gas sensor according to the present invention further includes the "position fixing portion that is in contact with the end surface of the elastic body on the leading end side in the axial direction (first end surface) and accordingly restricts the movement of the first end surface toward the leading end side in the axial direction".

For example, the gas sensor 1 includes the spacer 70 as the "position fixing portion that is in contact with the first end surface of the elastic body and accordingly restricts the movement of the first end surface toward the leading end side in the axial direction". That is, the gas sensor 1 includes the spacer 70 that is in contact with the leading end surface 53 (first end surface) of the elastic body 50 and accordingly restricts the movement of the leading end surface 53 toward the leading end side in the axial direction. Specifically, the spacer 70 is disposed on the rear end side with respect to the ceramic housing 60 in the axial direction of the gas sensor 1, and the movement toward the leading end side in the axial direction of the spacer 70 is restricted by the ceramic housing 60. The ceramic housing 60 houses the element electrode of the sensor element 10 and the element contact portion 31 of the terminal metal fitting 30. Therefore, in the gas sensor 1, the leading end surface 53 of the elastic body 50 is in contact with the spacer 70 and is restricted from moving toward the leading end side in the axial direction by the spacer 70.

Note that, in the gas sensor 1, the ceramic housing 60 and the spacer 70 may be an integral member. In this case, the leading end surface 53 of the elastic body 50 is in contact with the integral member, and the movement toward the leading end side in the axial direction is restricted by the integral member. That is, the gas sensor 1 may include the ceramic housing 60 integrally formed with the spacer 70 as the above-described position fixing portion.

Provided, however, that the gas sensor according to the present invention does not necessarily include the spacer 70 as the "position fixing portion that is in contact with the first end surface (leading end surface) of the elastic body and accordingly restricts the movement of the first end surface toward the leading end side in the axial direction". The gas sensor according to the present invention may not include the spacer 70. Instead of the spacer 70, the gas sensor according to the present invention may include a "ceramic housing that houses an element electrode of the sensor element 10 and the element contact portion 31 of the terminal metal fitting 30" as the position fixing portion.

For example, the gas sensor 1(D) includes the ceramic housing 60(D) as the "position fixing portion that is in contact with the end surface of the elastic body on the leading end side in the axial direction (first end surface) and accordingly restricts the movement of the first end surface toward the leading end side in the axial direction". That is, the gas sensor 1(D) includes the ceramic housing 60(D) that is in contact with the leading end surface 53(D) of the elastic body 50(D) being an end surface of the elastic body on the leading end side in the axial direction (first end surface). The ceramic housing 60(D) accordingly restricts the movement of the leading end surface 53(D) toward the leading end side in the axial direction. Similarly to the ceramic housing 60 in the gas sensor 1, the ceramic housing 60(D) houses the element electrode of the sensor element 10 and the element contact portion 31 of the terminal metal fitting 30. The position (e.g., a position in the axial direction) of the ceramic housing 60(D) in the tubular body 20(D) is fixed. In particular, the ceramic housing 60(D) is restrained from moving toward the leading end side.

In the gas sensor according to the present invention, the reduced diameter portion that swages a part of the elastic body from the periphery is formed on the rear end side of the tubular body. The diameter of the tubular body in the reduced diameter portion is constant in the axial direction. In the gas sensor according to the present invention, the post-swaging diameter Db, which is a diameter of the swaged portion being a portion of the elastic body swaged by the reduced diameter portion, is constant in the axial direction.

For example, in the gas sensor 1, the reduced diameter portion 221 that swages a part of the elastic body 50 from the periphery is formed on the rear end side of the tubular body 20 (outer tube 22). The diameter of the tubular body 20 in the reduced diameter portion 221 is constant in the axial direction. In the gas sensor 1, the post-swaging diameter Db, which is a diameter of the swaged portion 51, which is a portion of the elastic body 50 swaged by the reduced diameter portion 221, is constant in the axial direction.

Similarly, in the gas sensor 1(D), the reduced diameter portions 221(1) to 221(3) swaging a part of the elastic body 50(D) from the periphery are formed on the rear end side of the tubular body 20(D). The diameter of the tubular body 20(D) in each of the reduced diameter portions 221(1) to 221(3) is constant in the axial direction. The post-swaging diameters Db(1) to Db(3), which are respectively the diameters of the swaged portion 51(1) to 51(3) of the elastic body 50(D), are each constant in the axial direction. The swaged portions 51(1) to 51(3) are portions swaged by the respective reduced diameter portions 221(1) to 221(3).

In the gas sensor according to the present invention, the "pre-swaging diameter Da", the "post-swaging diameter Db", the "length Lc of the reduced diameter portion", the "length Ld of the non-swaged portion", the "first area Ae", and the "second area Af" satisfy the following Mathematical Expression (1). That is, the gas sensor according to the present invention satisfies:

$$0.038 \leq \left\{ (Lc \times Af)/(Ae \times Ld) \right\} \times$$ Mathematical Expression (1)

$$(1 - Db/Da) \leq 0.171.$$

In Mathematical Expression (1), the "pre-swaging diameter Da" represents the diameter of the elastic body before being swaged from the periphery by a "reduced diameter portion formed on the rear end side of the tubular body and configured to swage a part of an elastic body from a periphery". For example, the pre-swaging diameter Da in the gas sensor 1 represents the diameter of the elastic body 50 before being swaged from the periphery by the reduced diameter portion 221. The "post-swaging diameter Db" represents a diameter of "swaged portion which is a portion of the elastic body swaged by the reduced diameter portion". For example, the post-swaging diameter Db in the gas sensor 1 represents a diameter of the swaged portion 51 of the elastic body 50. The "length Lc of the reduced diameter portion" represents a length in the axial direction of the "reduced diameter portion formed on the rear end side of the tubular body and configured to swage apart of an elastic body from a periphery". For example, the length Lc of the reduced diameter portion in the gas sensor 1 represents the length in the axial direction of the reduced diameter portion 221. The "length Ld of the non-swaged portion" represents a length of the "non-swaged portion that is a portion of the elastic body on the leading end side with respect to the swaged portion in the axial direction". For example, the length Ld of the non-swaged portion in the gas sensor 1 represents the length (length in the axial direction) of the non-swaged portion 52 of the elastic body 50.

The "first area Ae" represents an area of the "end surface of the elastic body on the leading end side in the axial direction (first end surface)". For example, the first area Ae in the gas sensor 1 represents the area of the leading end surface 53 of the elastic body 50. The first area Ae in the gas sensor 1(D) represents the area of the leading end surface 53(D) of the elastic body 50(D).

The "second area Af" represents an area of the "end surface of the position fixing portion on the rear end side in the axial direction (second end surface), which is in contact with the first end surface of the elastic body". As described above, since the position fixing portion is the spacer 70 in the gas sensor 1, the second area Af in the gas sensor 1 represents an area of the rear end surface 71 (second end surface) of the spacer 70. Since the position fixing portion is the ceramic housing 60(D) in the gas sensor 1(D), the second area Af in the gas sensor 1(D) represents an area of the rear end surface 61(D) of the ceramic housing 60(D) (second end surface).

As has been described above, in the gas sensor according to the present invention, the diameter of the tubular body (corresponding to the "outer tube" of the known gas sensors) in the reduced diameter portion is constant in the axial direction. The post-swaging diameter Db, which is the diameter of the swaged portion of the elastic body, is constant in the axial direction.

Therefore, the gas sensor according to the present invention can solve the problems of the known gas sensors. Such problems include "increased difficulty in ensuring the air-tightness of the interior of the outer tube and increased risks such as rupture of the elastic body and occurrence of the displacement of a contact point, due to swaging the rear end side of the outer tube (tubular body) to have a tapered shape". That is, the gas sensor according to the present invention makes a diameter of the tubular body in the reduced diameter portion constant in the axial direction, thereby making it possible to reduce risks. Such risks include "deterioration of the airtightness of the interior of the outer tube, rupture of the elastic body, and occurrence of the displacement of a contact point" and are raised by swaging a rear end side of an outer tube (tubular body) to have a tapered shape.

Here, in order to obtain good airtightness of the tubular body, it is important that the elastic body (elastic body that seals the opening end of the tubular body and into which the lead wire is inserted) is swaged from the periphery to apply an appropriate stress to the elastic body. A generally known technique for improving the airtightness of the interior of the tubular body is to reduce the diameter of the reduced diameter portion within a range in which excessive stress in the axial direction is not applied to a portion of the elastic body swaged from the periphery by the tubular body (swaged portion). However, too large compressibility of the elastic body obtained by reducing the diameter of the reduced diameter portion leads to the excessively large deformation of the elastic body in the axial direction. This results in difficulty in maintaining the position of the first end surface of the elastic body on the leading end side in the axial direction within an allowable range by the position fixing portion. For example, it becomes difficult to maintain the position of the first end surface by the position fixing portion within a range in which the displacement of a contact point does not occur.

Given these factors, the gas sensor according to the present invention is configured such that an appropriate stress is applied to the non-swaged portion of the elastic body. With this configuration, good airtightness of the interior of the tubular body is ensured even when the diameter of the tubular body and the post-swaging diameter Db in the reduced diameter portion are constant in the axial direction. That is, the gas sensor according to the present invention converts the deformation in the axial direction of the elastic body caused in accordance with the length Lc of the reduced diameter portion and the amount of compression of the elastic body into the deformation in the radial direction (deformation contributing to airtightness) with the position fixing portion. In this way, the gas sensor according to the present invention achieves good airtightness of the interior of the tubular body. In particular, by adjusting the size and the like of each member so as to satisfy Mathematical Expression (1), the gas sensor according to the present invention can prevent the deformation of the elastic body in the axial direction from becoming too large and maintain the position of the first end surface of the elastic body within an allowable range by the position fixing portion.

For example, by adjusting the size and the like of each member so as to satisfy Mathematical Expression (1), the gas sensor 1 can prevent the deformation of the elastic body 50 in the axial direction from becoming too large and maintain the position of the leading end surface 53 of the elastic body 50 within an allowable range by the spacer 70. Similarly, by adjusting the size and the like of each member so as to satisfy Mathematical Expression (1), the gas sensor 1(D) can prevent the deformation of the elastic body 50(D) in the axial direction from becoming too large and maintain the position of the leading end surface 53(D) of the elastic body 50(D) within an allowable range by the ceramic housing 60(D).

Specifically, the compressibility Rc of the elastic body is expressed as "Re=1–Db/Da", where Da represents the pre-swaging diameter of the elastic body and Db represents the post-swaging diameter of the elastic body (swaged portion). Therefore, an amount of deformation in the axial direction (in particular, an amount of deformation toward the leading end side) $\Delta$ [mm] of the elastic body can be expressed as "$\Delta$=k×Lc×Rc", where k represents a constant determined by the material of the elastic body, Lc represents the length of the reduced diameter portion, and Rc represents the compressibility of the elastic body. Note that the elastic body is deformed from the center position in the axial direction of the swaged portion to both sides in the axial direction. Thus, the amount of deformation $\Delta$ of the elastic body toward the leading end side in the axial direction is, for example, half ("½") of the amount of deformation of the elastic body to both sides (both the leading end side and the rear end side) in the axial direction. Here, since the constant k includes "½", the amount of deformation of the elastic body toward the leading end side in the axial direction can be expressed by A as can be obtained from "$\Delta$=k×Lc×Rc". Therefore, the first parameter Pf, which is a ratio of the amount of deformation $\Delta$ in the axial direction to the length Ld of the non-swaged portion of the elastic body, can be expressed as "Pf=$\Delta$/Ld". Then, as described above, since "$\Delta$=k×Lc×Rc" and "Re=1–Db/Da" hold, the first parameter Pf can be expressed as "Pf={k×Lc×(1–Db/Da)}/Ld". The first parameter Pf is an index for evaluating the efficiency (conversion efficiency) of converting the stress applied to the elastic body into deformation in the axial direction. The larger the value of the first parameter Pf, the higher the conversion efficiency of converting the stress applied to the elastic body into deformation in the axial direction.

In the elastic body, the second parameter Ps, which is an index for evaluating the efficiency of converting deformation in the axial direction into deformation in the radial direction, can be expressed as follows. That is, the second parameter Ps can be expressed as a ratio of the second area Af being the area of the end surface on the rear end side of the position fixing portion (second end surface) to the first area Ae being the area of the end surface on the leading end side of the elastic body (first end surface). Specifically, the second parameter Ps can be expressed as "Ps=Af/Ae". The larger the value of the second parameter Ps, the higher the efficiency of converting deformation in the axial direction into deformation in the radial direction in the elastic body.

As described above, the larger the value of the first parameter Pf, the higher the conversion efficiency of converting the stress applied to the elastic body into deformation in the axial direction. The larger the value of the second parameter Ps, the higher the efficiency of converting deformation in the axial direction into deformation in the radial direction in the elastic body. Therefore, the comprehensive parameter Pc, which is an index for evaluating deformation (the amount of deformation in the axial direction, the amount of deformation in the radial direction, balance between both, and the like) of the elastic body, can be expressed as "Pc=Pf×Ps". Then, since "Pf={k×Lc×(1–Db/Da)}/Ld" and "Ps=Af/Ae" hold, the comprehensive parameter Pc can be expressed as "Pc=k×{(Lc×Af)/(Ae×Ld)}×(1–Db/Da)".

The inventors of the present invention have confirmed through an experiment that "0.038k" or more of the value of the comprehensive parameter Pc contributes to ensuring the airtightness of the tubular body (corresponding to the "outer tube" in the known gas sensors), which is to be achieved by the elastic body.

In addition, the inventors of the present invention have confirmed through the experiment that "0.171k" or less of the value of the comprehensive parameter Pc contributes to avoiding a situation where "deformation and movement of the elastic body in the axial direction are increased to cause displacement of a contact point". Specifically, in the gas sensor, when "the deformation in the axial direction of the elastic body becomes excessive, and deformation in the axial direction is not fully converted into deformation in the radial direction with the position fixing portion", the position fixing portion itself moves in the axial direction (in particular, toward the leading end side). Therefore, the inventors of the present invention have obtained through the experiment the value of the comprehensive parameter Pc in a range in which the "position fixing portion can convert the deformation in the axial direction of the elastic body into the deformation in the radial direction". Specifically, the inventors of the present invention have obtained through the experiment the value of the comprehensive parameter Pc with which the positional movement (movement toward the leading end side) of the first end surface of the elastic body is maintained within an allowable range. As a result, the inventors of the present invention have confirmed that the positional movement of the first end surface of the elastic body can be maintained within an allowable range by setting the value of the comprehensive parameter Pc to "0.171k" or less.

As has been described above, the inventors of the present invention have confirmed through the experiment that the airtightness of the interior of the tubular body ("outer tube") can be ensured and occurrence of the displacement of a contact point can be effectively prevented when the value of the comprehensive parameter Pc falls within the following range. That is, the inventors of the present invention have confirmed that airtightness can be ensured, and occurrence of the displacement of a contact point, can be effectively prevented by setting the value of the comprehensive parameter Pc is set to "0.038k" or more and "0.171k" or less. Here, since "Pc=k×{(Lc×Af)/(Ae×Ld)}×(1−Db/Da)" holds, the expression concerning the comprehensive parameter Pc can be rearranged to "0.038k≤k×{(Lc×Af)/(Ae×Ld)}×(1−Db/Da)≤0.171k". Since the "constant k" is common in each side of the relational expression, when the constant k is excluded from each side, "0.038≤{(Lc×Af)/(Ae×Ld)}×(1−Db/Da)≤0.171" is obtained.

The gas sensor according to the present invention satisfies the Mathematical Expression (1), that is, satisfies "0.038≤{(Lc×Af)/(Ae×Ld)}×(1−Db/Da)≤0.171". Therefore, the gas sensor according to the present invention exerts an effect that the airtightness of the interior of the tubular body can be ensured as well as occurrence of the displacement of a contact point can be effectively prevented, without swaging the rear end side of the outer tube (tubular body) to have a tapered shape.

Note that the inventors of the present invention have confirmed through the experiment that the second parameter Ps is not improved even when the second area Af is made larger than the first area Ae, where the first area Ae is the area of the first end surface of the elastic body, and the second area Af is the area of the second end surface of the position fixing portion.

The inventors of the present invention have confirmed that, for example, in the gas sensor 1, the second parameter Ps is not improved even when the second area Af is made larger than the first area Ae, where the first area Ae is the area of the leading end surface 53 of the elastic body 50, and the second area Af is the area of the rear end surface 71 of the spacer 70. Similarly, the inventors have confirmed that, for example, in the gas sensor 1(D), the second parameter Ps is not improved even when the second area Af is made larger than the first area Ae, where the first area Ae is the area of the leading end surface 53(D) of the elastic body 50(D), and the second area Af is the area of the rear end surface 61(D) of the ceramic housing 60(D).

In addition, the inventors of the present invention have confirmed through the experiment that the upper limit of the compressibility Rc (=1−Db/Da) of the elastic body is determined in accordance with the material of the elastic body. For example, when fluororubber is used as the material of the elastic body, the upper limit (compression limit) of the compressibility Rc is "0.25". The inventors of the present invention have also confirmed that the elastic body is not ruptured (i.e., the risk of rupture of the elastic body can be reduced) when the compressibility Rc of the elastic body falls within a range of a compression limit (e.g., "0.25") or less determined in accordance with the material of the elastic body.

As described above, in the gas sensor according to the present invention, a plurality of the above-described reduced diameter portions may be formed on the rear end side of the tubular body. That is, in the gas sensor according to the present invention, a plurality of the reduced diameter portions each of which swages a part of the elastic body from the periphery may be formed on the rear end side of the tubular body. The diameter of the tubular body in each of a plurality of the reduced diameter portions may be constant in the axial direction. The diameter (post-swaging diameter Db) of each of a "plurality of swaged portions which are portions of the elastic body swaged by the respective reduced diameter portions" may be constant in the axial direction.

When a plurality of reduced diameter portions are formed on the rear end side of the tubular body, the pre-swaging diameter Da, the length Ld of the non-swaged portion, the first area Ae, and the second area Af are common among a plurality of the reduced diameter portions. The total of {(Lc×Af)/(Ae×Ld)}×(1−Db/Da) respectively calculated for a plurality of the reduced diameter portions using the respective post-swaging diameters Db and the respective lengths Lc of the reduced diameter portions of a plurality of the reduced diameter portions is 0.038 or more and 0.171 or less.

For example, in the gas sensor 1(D), the reduced diameter portions 221(1) to 221(3) swaging a part of the elastic body 50(D) from the periphery are formed on the rear end side of the tubular body 20(D). A diameter of the tubular body 20(D) in each of the reduced diameter portions 221(1) to 221(3) is constant in the axial direction. The diameter of each of the swaged portions 51(1) to 51(3) being portions swaged by the respective reduced diameter portions 221(1) to 221(3) of the elastic body 50(D) is constant in the axial direction. That is, the post-swaging diameters Db(1) to Db(3), which are respectively the diameters of the swaged portion 51(1) to 51(3), are each constant in the axial direction.

Moreover, in the gas sensor 1(D), a total of the comprehensive parameters Pc(1) to Pc(3) respectively calculated for the reduced diameter portions 221(1) to 221(3) is "0.038k" or more and "0.171k" or less. In other words, in the gas sensor 1(D), a total of "{(Lc×Af)/(Ae×Ld)}×(1−Db/Da)" respectively calculated for the reduced diameter portions 221(1) to 221(3) is 0.038 or more and 0.171 or less.

As has been described above, the gas sensor according to the present invention exerts an effect that the airtightness of the interior of the tubular body can be ensured as well as occurrence of the displacement of a contact point can be effectively prevented, by adjusting the size and the like of each member so as to satisfy Mathematical Expression (1). Here, the inventors of the present invention have further confirmed through the experiment that the comprehensive parameters Pc set to "0.050k" or more and "0.094k" or less can remarkably improve the airtightness of the interior of the tubular body and can highly effectively prevent occurrence of the displacement of a contact point.

Therefore, in the gas sensor according to the present invention, the pre-swaging diameter Da of the elastic body, the post-swaging diameter Db of the elastic body, the length Lc of the reduced diameter portion, the length Ld of the non-swaged portion of the elastic body, the first area Ae being the area of the first end surface of the elastic body, and the second area Af being the area of the second end surface of the position fixing portion desirably satisfy the following Mathematical Expression (2). That is, the gas sensor according to the present invention desirably satisfies:

$$0.050 \le \{(Lc \times Af)/(Ae \times Ld)\} \times \qquad \text{Mathematical Expression (2)}$$

$$(1 - Db/Da) \le 0.094.$$

When the above-described Mathematical Expression (2) is satisfied, the gas sensor according to the present invention exerts an effect of ensuring remarkably good airtightness of the interior of the tubular body and highly effectively preventing occurrence of the displacement of a contact point.

Note that, as has been described above, it is sufficient that in the gas sensor according to the present invention, the "position fixing portion that is in contact with the end surface of the elastic body on the leading end side in the axial direction (first end surface) and accordingly restricts the movement of the first end surface toward the leading end side in the axial direction" be any one of the following configuration. That is, in the gas sensor according to the present invention, the above-described position fixing portion may be a "ceramic housing that houses an element electrode of the sensor element and the element contact portion of the terminal metal fitting" and may be, for example, the ceramic housing 60(D) of the gas sensor 1(D). The above-described position fixing portion may be the "spacer that is disposed on the rear end side with respect to the ceramic housing in the axial direction and is restricted from moving toward the leading end side in the axial direction by the ceramic housing" and may be, for example, the spacer 70 of the gas sensor 1. The above-described position fixing portion may be a "ceramic housing integrally formed with the spacer", and may be, for example, a member in which the ceramic housing 60 and the spacer 70 of the gas sensor 1 are integrally molded.

The gas sensor according to the present invention exerts an effect that risks can be reduced by using any one of the above-described ceramic housing, spacer, and ceramic housing formed integrally with the spacer. Such risks include "deterioration of the airtightness of the tubular body, rupture of the elastic body, and occurrence of the displacement of a contact point".

Modified Example

Although the embodiments of the present invention have been described above, the foregoing description of the embodiments is merely an example of the present invention in all respects. Various improvements and modifications may be made to the above-described embodiments. Omission, replacement, and addition of the constituent element may be performed on each constituent element of the above-described embodiments, if necessary. In addition, the shape and dimension of each constituent element of the above-described embodiments may be changed if necessary, depending on the practical implementation of the present invention. For example, the following changes can be made. Note that, in the following description, the same constituent elements as those of the above embodiment are denoted by the same reference signs, and the description for the same features as those of the above-described embodiment is omitted as appropriate. The following modified examples can be combined, if necessary.

FIGS. 1 and 2 illustrate an example of the spacer 70 in which the end surface (leading end surface) on the leading end side in the axial direction is flat. However, the gas sensor according to the present invention does not necessarily include the spacer 70 having a flat leading end surface. The spacer 70 is in contact with the ceramic housing 60 (in particular, the end surface on the rear end side of the ceramic housing 60; rear end surface) at the leading end surface. In this regard, the spacer 70 may be in contact with the ceramic housing 60 only at a part of the leading end surface of the spacer 70. For example, one or a plurality of recesses may be formed on the leading end surface of the spacer 70. The leading end surface of the spacer 70 and the ceramic housing 60 (in particular, the rear end surface of the ceramic housing 60) may be in contact with each other in a portion excluding the one or a plurality of the recesses. Alternatively, one or a plurality of protrusions may be formed on the leading end surface of the spacer 70. The leading end surface of the spacer 70 and the ceramic housing 60 may be in contact with each other only at an apex (apices) of the one or a plurality of the protrusions (in a case of forming a plurality of protrusions, an apex of each of a plurality of the protrusions).

The gas sensor according to the present invention can achieve the following effects by bringing the spacer 70 into contact with the ceramic housing 60 (in particular, the rear end surface of the ceramic housing 60) not at the entire leading end surface but only at a part of the leading end surface. That is, the gas sensor according to the present invention exerts an effect that heat transfer from the ceramic housing 60 to the spacer 70 and further to the elastic body 50 can be reduced. For example, in order to prevent thermal deterioration of the elastic body 50 while ensuring the strength of the spacer 70, the gas sensor according to the present invention may form at least one of one or a plurality of recesses and one or a plurality of protrusions at the leading end surface of the spacer 70. The spacer 70 having at least one of one or a plurality of recesses and one or a plurality of protrusions formed on the leading end surface is in contact with the ceramic housing 60 (in particular, the rear end surface of the ceramic housing 60) not at the entire leading end surface but at a part of the leading end surface.

EXAMPLES

In order to verify the effect of the present invention, the inventors of the present invention fabricated gas sensors according to Examples 1 to 7 below. Note that the present invention is not limited to the following Examples.

TABLE 1

| | Comprehensive parameter Pc ("constant k" is omitted) | Result/To be improved |
| --- | --- | --- |
| Example 1 | 0.034 | X/Airtightness |
| Example 2 | 0.038 | ○/Airtightness |
| Example 3 | 0.042 | ○/Airtightness |
| Example 4 | 0.050 | ⊙ |
| Example 5 | 0.094 | ⊙ |
| Example 6 | 0.171 | ○/Positional displacement |
| Example 7 | 0.181 | X/Positional displacement |

In Table 1, each of Examples 1 to 7 is a gas sensor including members illustrated in FIG. 1. In the gas sensor according to each of Examples 1 to 7 in which the position of the spacer 70 (more precisely, the ceramic housing 60) in the axial direction is fixed "with force having a predetermined range of magnitude (adopted in general gas sensors)". However, values of the comprehensive parameters Pc ($=k \times \{(Lc \times Af)/(Ae \times Ld)\} \times (1-Db/Da)$) for the gas sensors according to Examples 1 to 7 are different from each other. That is, the gas sensors according to Examples 1 to 7 have the same configuration except for the values of the comprehensive parameters Pc. Note that, in the following description, the "comprehensive parameter Pc ('constant k' is omitted)" in Table 1 is simply referred to as the "comprehensive parameter Pc" for simplification of description.

Each of Examples 1 and 7 is a gas sensor in which the value of the comprehensive parameter Pc does not fall within the range of "0.038" to "0.171". Specifically, the value of the comprehensive parameter Pc for the gas sensor according to Example 1 is "0.034", and the value of the comprehensive parameter Pc for the gas sensor according to Example 7 is "0.181".

Each of Examples 2 to 6 is a gas sensor in which the value of the comprehensive parameter Pc does fall within a range of "0.038" to "0.171". Specifically, the value of the comprehensive parameter Pc for the gas sensor according to Example 2 is "0.038", the value of the comprehensive parameter Pc for the gas sensor according to Example 3 is "0.042", and the value of the comprehensive parameter Pc for the gas sensor according to Example 4 is "0.050". The value of the comprehensive parameter Pc for the gas sensor according to Example 5 is "0.094", the value of the comprehensive parameter Pc for the gas sensor according to Example 6 is "0.171". In particular, the gas sensor according to each of Examples 4 and 5 has the value of the comprehensive parameter Pc falling within the range of "0.050" to "0.094".

The inventors of the present invention conducted the experiment to confirm the airtightness of the interior of the tubular body 20 and the restraint of positional displacement (specifically, whether the spacer 70 can restrain the movement of the leading end surface 53 of the elastic body 50 within an allowable range) for the gas sensor according to each of Examples 1 to 7. The "allowable range" is, for example, a range with which the displacement of a contact point (loss or disconnection of electrical connection between the element electrode of the sensor element 10 and the terminal metal fitting 30) does not occur.

The gas sensor for which it was confirmed through the above-described experiment that airtightness was good and positional displacement was satisfactorily restrained is evaluated as "good" and denoted by "⊙" in the "Result" in Table 1. The gas sensor for which it was confirmed that airtightness fell within the allowable range and the positional displacement was restrained within the allowable range is evaluated as "acceptable" and denoted by "o" in the "Result" in Table 1. The gas sensor for which it was confirmed that airtightness did not fall within the allowable range or the positional displacement exceeded the allowable range is evaluated as "unacceptable" and denoted by "x" in the "Result" in Table 1.

"To be improved" indicates performance that was successfully confirmed as a factor to be improved (or an improvable factor) through the above-described experiment for the gas sensor according to each of Examples 1 to 7. That is, "airtightness" cited as the "To be improved" indicates that it was confirmed through the experiment that "it would be better if the airtightness of the interior of the tubular body 20 is improved (or the airtightness of the interior of the tubular body 20 was improvable)". Similarly, "positional displacement" cited as the "To be improved" indicates that it was confirmed through the experiment that "it would be better if the restraint of the positional displacement is improved (or the restraint of the positional displacement is improvable)".

The "Result" of the gas sensor according to each of Examples 1 and 7 in which the value of the comprehensive parameter Pc does not fall within the range of "0.038" to "0.171" was "x". On the other hand, the "Result" of the gas sensor according to each of Examples 2 to 6 in which the value of the comprehensive parameter Pc falls within the range of "0.038" to "0.171" was "o" or "⊙". Therefore, it was confirmed that the airtightness of the interior of the tubular body 20 can be secured as well as positional displacement can be restrained and accordingly the occurrence of the displacement of a contact point can be effectively prevented by setting the value of the comprehensive parameter Pc in the range of "0.038" to "0.171".

As has been described above, the gas sensor in which the pre-swaging diameter Da, the post-swaging diameter Db, the length Lc of the reduced diameter portion, the length Ld of the non-swaged portion, the first area Ae, and the second area Af satisfy the following Mathematical Expression (1) successfully ensured the airtightness of the interior of the tubular body 20 and successfully and effectively prevented occurrence of the displacement of a contact point. That is, in the gas sensor satisfying the following expression:

$$0.038 \leq \{(Lc \times Af)/(Ae \times Ld)\} \times \qquad \text{Mathematical Expression (1)}$$
$$(1 - Db/Da) \leq 0.171,$$

the airtightness of the interior of the tubular body 20 was successfully ensured, and occurrence of the displacement of a contact point was successfully and effectively prevented.

Among Examples 2 to 6, the "Result" of the gas sensor according to each of Examples 4 and 5 in which the value of the comprehensive parameter Pc falls within the range of "0.050" to "0.094" was "⊙". On the other hand, the "Result" of the gas sensor according to each of Examples 2, 3 and 6 in which the value of the comprehensive parameter Pc falls within the range of "0.038" to "0.171" but does not fall within the range of "0.050" to "0.094" was "o". Therefore, it was confirmed that when the value of the comprehensive parameter Pc is set to fall within the range of "0.050" to "0.094", the airtightness of the interior of the tubular body 20 is remarkably improved as well as the effect of restraining positional displacement is remarkably improved and accordingly the occurrence of the displacement of a contact point can be highly effectively prevented.

As has been described above, the gas sensor in which the pre-swaging diameter Da, the post-swaging diameter Db, the length Lc of the reduced diameter portion, the length Ld of the non-swaged portion, the first area Ae, and the second area Af satisfy the following Mathematical Expression (2) exerts an effect that remarkably good airtightness of the interior of the tubular body 20 can be ensured and occurrence of the displacement of a contact point can be highly effectively prevented. That is, the gas sensor satisfying the following expression:

$$0.050 \leq \{(Lc \times Af)/(Ae \times Ld)\} \times \qquad \text{Mathematical Expression (2)}$$
$$(1 - Db/Da) \leq 0.094$$

exerts an effect that remarkably good airtightness of the interior of the tubular body 20 can be ensured, and occurrence of the displacement of a contact point can be highly effectively prevented.

Note that, as described above, each of Examples 1 to 7 is a gas sensor including members illustrated in FIG. 1. Thus, in the above-described Mathematical Expressions (1) and (2), the pre-swaging diameter Da represents a diameter of the elastic body 50 before being swaged from the periphery by the reduced diameter portion 221. A post-swaging diameter Db is a diameter of the swaged portion 51 being a portion of the elastic body 50 swaged by the reduced diameter portion 221. The length Lc of the reduced diameter portion represents a length of the reduced diameter portion 221 of the tubular body 20 in the axial direction. The length Ld of the non-swaged portion represents a length in the axial direction of the non-swaged portion 52 being the portion of the elastic body 50 on the leading end side with respect to the swaged portion 51 in the axial direction. The first area Ae represents an area of the leading end surface 53 of the elastic body 50 (first end surface). The second area Af represents the rear end surface 71 of the spacer 70 (position fixing portion).

REFERENCE SIGNS LIST

1, 1 (A), 1 (B), 1 (C), 1 (D) Gas sensor
10 Sensor element
20 Tubular body
221 Reduced diameter portion
30 Terminal metal fitting
40 Lead wire
50 Elastic body
51, 51 (1), 51 (2), 51 (3) Swaged portion
52 Non-swaged portion
53 Leading end surface (first end surface)
60 (D) Ceramic housing (position fixing portion)
61 (D) Rear end surface (second end surface)
70 Spacer (position fixing portion)
71 Rear end surface (second end surface)

The invention claimed is:

1. A gas sensor configured to detect a concentration of a specific gas in a gas to be measured, the gas sensor comprising:

a sensor element extending in an axial direction, the sensor element including a detector on a leading end side, and an element electrode on a rear end side;

a tubular body including an opening end, the sensor element being disposed inside the tubular body;

a terminal metal fitting extending in the axial direction;

a lead wire being electrically connected to the element electrode via the terminal metal fitting, the lead wire extending outward from the opening end;

an elastic body configured to seal the opening end, the lead wire being inserted into the elastic body; and a position fixing portion being in contact with a first end surface being an end surface of the elastic body on the leading end side in the axial direction, the position fixing portion configured to restrict the first end surface from moving toward the leading end side in the axial direction, wherein the tubular body includes a reduced diameter portion being formed on a rear end side of the tubular body, the reduced diameter portion configured to swage a part of the elastic body from a periphery, the tubular body in the reduced diameter portion has a diameter being constant in the axial direction, the elastic body has a post-swaging diameter Db being constant in the axial direction, the post-swaging diameter Db being a diameter of a swaged portion that is a portion of the elastic body being swaged by the reduced diameter portion, and

46 the gas sensor satisfies Mathematical Expression (1) below:

$$0.038 \leq \{(Lc \times Af)/(Ae \times Ld)\} \times \qquad \text{Mathematical Expression (1)}$$
$$(1 - Db/Da) \leq 0.171$$

where,

"Da" represents a pre-swaging diameter Da being a diameter of the elastic body before being swaged from the periphery by the reduced diameter portion, "Db" represents the post-swaging diameter Db, "Lc" represents a length Lc of the reduced diameter portion, the length Lc being a length of the reduced diameter portion in the axial direction, "Ld" represents a length Ld of a non-swaged portion, the length Ld being a length of the non-swaged portion of the elastic body, the non-swaged portion being on the leading end side with respect to the swaged portion in the axial direction, "Ae" represents a first area Ae being an area of the first end surface, and "Af" represents a second area Af being an area of a second end surface, the second end surface being in contact with the first end surface, the second end surface being an end surface of the position fixing portion on the rear end side in the axial direction.

2. The gas sensor according to claim 1, wherein the pre-swaging diameter Da of the elastic body, the post-swaging diameter Db of the elastic body, the length Lc of the reduced diameter portion, the length Ld of the non-swaged portion of the elastic body, the first area Ae being the area of the first end surface of the elastic body, and the second area Af being the area of the second end surface of the position fixing portion satisfy Mathematical Expression (2) below:

$$0.050 \leq \{(Lc \times Af)/(Ae \times Ld)\} \times \qquad \text{Mathematical Expression (2)}$$
$$(1 - Db/Da) \leq 0.094.$$

3. The gas sensor according to claim 1, wherein the elastic body contains fluororubber.

4. The gas sensor according to claim 1, wherein the non-swaged portion has a diameter varying in the axial direction.

5. The gas sensor according to claim 4, wherein the non-swaged portion has a diameter being smaller toward the leading end side in the axial direction.

6. The gas sensor according to claim 4, wherein an end of the non-swaged portion on the leading end side in the axial direction is chamfered.

7. The gas sensor according to claim 1, wherein
the position fixing portion is any one of
a ceramic housing that houses the element electrode and an element contact portion of the terminal metal fitting, the element contact portion being electrically connected to the element electrode,
a spacer being disposed on the rear end side in the axial direction with respect to the ceramic housing, the spacer being restricted from moving to the leading end side in the axial direction by the ceramic housing, and
the ceramic housing being formed integrally with the spacer.

8. The gas sensor according to claim 1, wherein a plurality of the reduced diameter portions are formed on the rear end side of the tubular body, each of the pre-swaging diameter Da, the length Ld of the non-swaged portion, the first area Ae, and the second area Af is common among the plurality of reduced diameter portions, and a total of $\{(Lc \times Af)/(Ae \times Ld)\} \times (1 - Db/Da)$ being respectively calculated for the plurality of reduced diameter portions using the post-swaging diameter Db and the length Lc of each of the plurality of reduced diameter portions is 0.038 or more and 0.171 or less.

9. The gas sensor according to claim 2, wherein the elastic body contains fluororubber.

10. The gas sensor according to claim 2, wherein the non-swaged portion has a diameter varying in the axial direction.

11. The gas sensor according to claim 10, wherein the non-swaged portion has a diameter being smaller toward the leading end side in the axial direction.

12. The gas sensor according to claim 10, wherein an end of the non-swaged portion on the leading end side in the axial direction is chamfered.

13. The gas sensor according to claim 2, wherein the position fixing portion is any one of a ceramic housing that houses the element electrode and an element contact portion of the terminal metal fitting, the element contact portion being electrically connected to the element electrode, a spacer being disposed on the rear end side in the axial direction with respect to the ceramic housing, the spacer being restricted from moving to the leading end side in the axial direction by the ceramic housing, and the ceramic housing being formed integrally with the spacer.

14. The gas sensor according to claim 2, wherein a plurality of the reduced diameter portions are formed on the rear end side of the tubular body, each of the pre-swaging diameter Da, the length Ld of the non-swaged portion, the first area Ae, and the second area Af is common among the plurality of reduced diameter portions, and a total of $\{(Lc \times Af)/(Ae \times Ld)\} \times (1 - Db/Da)$ being respectively calculated for the plurality of reduced diameter portions using the post-swaging diameter Db and the length Lc of each of the plurality of reduced diameter portions is 0.038 or more and 0.171 or less.

\* \* \* \* \*